United States Patent [19]

Inoyama et al.

[11] 4,166,945
[45] Sep. 4, 1979

[54] VERSATILE AUTOMATIC TRANSACTION EQUIPMENT

[75] Inventors: Tadao Inoyama, Yokohama; Kokichi Aomori, Tokyo; Hidekazu Terai, Kodaira, all of Japan

[73] Assignee: Hitachi, Ltd., Japan

[21] Appl. No.: 911,930

[22] Filed: Jun. 2, 1978

[30] Foreign Application Priority Data

Jun. 13, 1977 [JP] Japan .................. 52-68916

[51] Int. Cl.² .................. G06F 15/30; G07F 7/08; H04Q 9/00
[52] U.S. Cl. .................. 235/379; 235/381; 364/200
[58] Field of Search .................. 235/379, 381; 340/149 A; 364/200

[56] References Cited

U.S. PATENT DOCUMENTS

| | | | |
|---|---|---|---|
| 3,937,925 | 2/1976 | Boothroyd | 235/379 |
| 3,956,615 | 5/1976 | Anderson et al. | 235/379 |
| 4,091,448 | 5/1978 | Clausing | 235/379 |

Primary Examiner—Daryl W. Cook
Attorney, Agent, or Firm—Craig and Antonelli

[57] ABSTRACT

A versatile automatic transaction equipment comprises: a basic module including a user operation unit, an ID card processing unit, a transaction recording unit, and a cash delivery unit for cash payment transaction or verification of customer account balance; a deposit-receiving sub-module including a unit for identifying the type or class and authenticity of bill or bills inserted into the equipment for a deposit by a user and for counting the amount of money received as a deposit, and a bill transport unit for separately transporting the bills in two routes of rejection and receipt in accordance with the result of identification; and a passbook-processing sub-module including a magnetic data processing unit for reading and/or writing magnetic record data from the magnetic stripe attached to the passbook inserted by the user, and a printer unit for printing data representing the transaction history of the associated account. Each of the modules includes a control system having a programmable microprocessor and a terminal unit control circuit interconnected by an information bus, and an interface for inter-module data transfer.

7 Claims, 25 Drawing Figures

VERSATILE AUTOMATIC TRANSACTION EQUIPMENT

LIST OF PRIOR ART REFERENCES (37 CFR 1.56(a))

The following references are cited to show the state of the art: U.S. Pat. Nos. 3,648,020, 3,937,925.

BACKGROUND OF THE INVENTION

1. Field of the Invention

This invention relates to a versatile automatic transaction equipment by which a customer executes a plurality of bank transactions including cash payment and receipt.

2. Description of the Prior Art

Devices for automating the counter transactions of banks which already find application include an automatic cash dispenser and an automatic cash depositing machine. To meet the demand on the part of banks to reduce the space required for such devices, a versatile transaction equipment which has a combined function of the above-mentioned two transaction machines has been developed as disclosed in U.S. Pat. No. 3,648,020. One of the advantages of the versatile automatic transaction equipment lies in the wider time zone offered to customers for bank transactions than the ordinary bank business hours. Another advantage is that users or customers are able to draw or deposit cash freely and speedily without the labor of bank clerks.

Cash payment accounts for the greatest proportion of bank counter transactions, and therefore, it is generally a cash dispenser of all the transaction machines that is first installed in a bank. With the wider extension of transaction machines and the resulting familialization of users with automatic transactions, the types of automatic transactions entrusted to users' operation are on the increase to such an extent that the types of transactions that have so far been implemented through bank clerks, including depositing, posting transaction history in passbooks and transfer business tend to be taken over by the transaction machines.

The conventional automatic transaction equipment with a modular construction attempting to meet the trend toward an increasing number of types of transactions handled by transaction machines, is suggested by U.S. Pat. No. 3,937,925 in which a control system, which includes a programmable microprocessor and a plurality of passive terminal elements (sub-system) interconnected by a terminal information bus, operates to assemble user supplied information, terminal status information, communicates transaction request to a host, and provides central information to terminal modules for the execution of requested transactions in a manner consistent with host generated transaction reply messages. Each sub-system handles one or more terminal functions such as the control of hardware of the control of user communications in direct response to microprocessor control information. All decision makings are handled by the microprocessor with only specific, well defined commands being executed by the bus connected modules.

In such a control system, the types of executable transactions are increased in number by changing the program of the microprocessor and by connecting additional required hardware to the terminal information bus.

In view of the fact that the operation of all sub-systems is controlled by a single microprocessor, the complication of transactions imposes a large burden on the microprocessor, with the result that it takes a long time to process one transaction depending on the type thereof.

Assume, for instance, that a depositing sub-system is in operation which requires the processes of collecting the printing pattern of the bill or paper money inserted by a user for depositing, and comparing it with a reference pattern to identify the type and authenticity of that bill. The microprocessor is busy with data processing for this sub-system, and has no room for sufficient control of the operation of the other sub-systems. In like manner, it is busy with data processing for the passbook-printing sub-system while in operation for processing the data printing of the passbook, during which time it is difficult for the microprocessor to process a more sophisticated control such as the operation control of the cash payment sub-system at the same time. The conventional versatile automatic transaction equipment thus has a limitation of control quantity for parallel operation of two or more sub-systems, so that main sub-systems requiring much time for data processing are operated in time series, resulting in a long time required for completing each transaction.

SUMMARY OF THE INVENTION

An object of the present invention is to provide an improved versatile automatic transaction equipment in which the types of transactions are easily increased or decreased in number, and complicated transactions are processed with great rapidity.

According to the present invention, there is provided a versatile automatic transaction equipment comprising a basic module for executing basic transactions, and at least one sub-module for executing an additional transaction designated by the owner of the transaction equipment at his option. The component elements of each of the modules are controlled by a control system including a programmable microprocessor.

The basic module includes mechanical or electrical terminal units which comprise a user operation panel unit, an ID card processing unit, a transaction recording unit, and a bill delivery unit for payment. The basic module control system includes at least one terminal control unit for controlling the terminal units one by one or by group, a module interface unit for communication with the sub-module, a control panel unit for the bank clerk in charge, and a communication control unit for communication with the host data processor, all of which units are interconnected with a programmable microprocessor through an information bus. Each of the terminal units is allotted with a well defined address code. In response to a specific address data appearing on the information bus, the terminal control unit collects command data from the microprocessor, controls the mechanical or electrical terminal unit connected therewith on the basis of the command data, and produces selectively terminal unit status data on the information bus.

The microprocessor monitors the conditions of the transaction equipment in accordance with the program in the data storage, and effects sequence control corresponding to the transaction designated by the user.

Each sub-module, on the other hand, includes at least one mechanical or electrical terminal unit for executing transactions other than payment. The sub-module control system includes a terminal control unit for controlling the terminal unit, and an interface unit for communication with the basic module. Each of these units is interconnected with the programmable module through the information bus.

The microprocessor for each module actuates the sub-module associated therewith in response to task data supplied from the basic module through the interface unit.

The task data is a concept wider than the command produced by the microprocessor of the basic module on the information bus for control of each terminal unit in the basic module. In response to the task data from the basic module, each sub-module microprocessor executes the program sequence and produces command data sequentially on the information bus, and actuates the terminal units to read the status data. Upon completion of one task, data indicating task completion is supplied from the sub-module to the basic module. The main module control system is capable of data processing for control of another terminal unit while waiting for the arrival of the task completion data from the sub-module.

According to the transaction equipment of the present invention, it is possible for the data storage of the basic module to contain a plurality of type of transaction sequences including those transactions to be executed in the future by addition of a sepcific sub-module. Of all these transaction sequences thus stored, executable transactions are selected by switches on a control panel or a remote panel. The program included in the basic module changes the transaction type selection guide indication on the user operating panel in response to the switches. If a specific sub-module included in the transaction equipment develops a fault, the faulty module is operatively separated by switch operation to continue equipment operation with fewer types of transactions offered to the user for selection. When the faulty sub-module has been repaired or a new sub-module is added, on the other hand, a guidance for increased types of transactions available for designation by the user is indicated. The switch for isolating the sub-module may be located on the module interface.

BRIEF DESCRIPTION OF THE DRAWINGS

To facilitate the understanding of the present invention, an embodiment of the present invention will be explained below with reference to the accompanying drawings.

DESCRIPTION OF THE PREFERRED EMBODIMENTS

Figure 1:
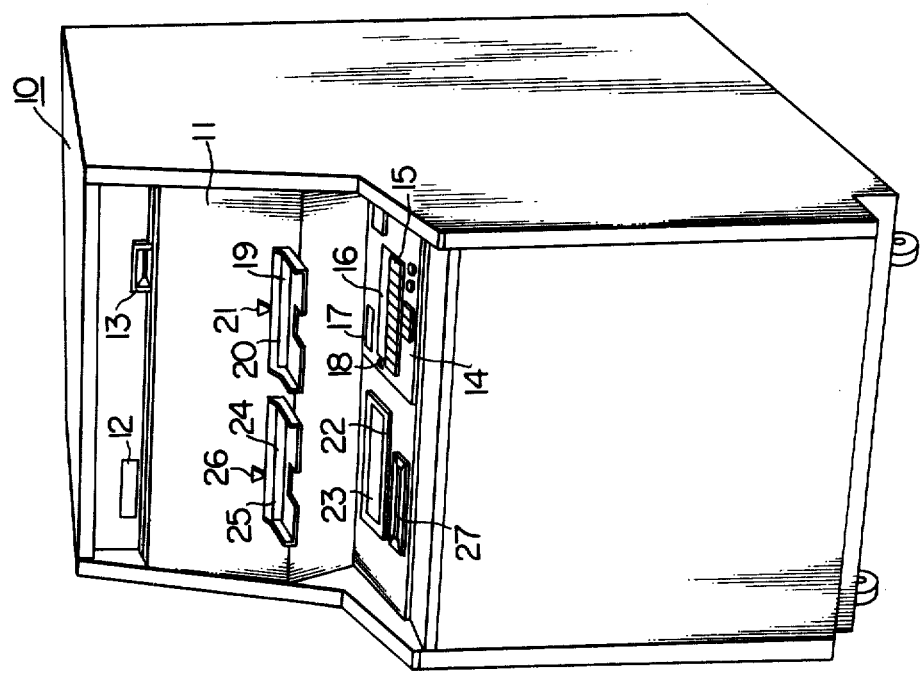
FIG. 1 is an outside view of the transaction equipment according to the present invention.

The transaction equipment according to the present invention comprises various mechanisms on the front panel 11 of a housing, to which the user wanting to make a transaction is permitted to have access, as shown in FIG. 1. The operating conditions of the transaction equipment are indicated on an indicator 12, whereby the user is able to know the types of transactions handled and whether such transactions are possible. A slot designated by reference numeral 13 is for insertion of an ID card carried by the user, to which card magnetic stripe magnetically recorded with his account information is attached. A user operating panel 14 includes a keyboard 15 through which the user selects the type of transaction and enters the data required for execution of the transaction, a guidance indicator 16 for indicating the written information to instruct the user on the next step to be followed by the user, a display unit 17 for indicating the numerical information including the amount data entered by the user on the keyboard 15 and the amount data generated by the transaction equipment, and a lamp 18 for attracting the user attention to the guidance indicator 16. A slot 19 is for discharging transaction articles including the ID card inserted by the user into the slot 13, a statement showing the transaction results issued by the transaction equipment and cash paid when the user selects a cash payment transaction, and is normally closed by a shutter 20. At the time of discharge of the articles, the shutter 20 opens so that the ends of articles are projected out of the discharge slot 19 to such an extent as to be capable of being pulled out by the user. At the same time, the lamp 21 is turned on, thereby informing the user that the articles have been discharged from the discharge slot 19.

A slot 22 is for inserting a bill or bills to be deposited collectively into the equipment. The slot 22 is normally closed by the shutter 23, which opens automatically in a predetermined timing only when the user selects the deposit transaction. The bills thus inserted into the bill insertion slot 22, after the user has closed the shutter 23, are checked for the type of money and its authenticity by bill verifier means in the equipment, and the total amount of the bills accepted by the bill verifier means is indicated on the amount indicator 17. Bills rejected by the bill verifier means, including forged bills or improper types of bills, are discharged from a return slot 24 located over the bill insertion slot 22. The bill return slot 24, which is normally closed by the shutter 25, opens automatically and with the lamp 26 turned on, discharges rejected bills, if any, upon completion of the verification of all the bills inserted by the user. In the case where the user, in recognition of the deposit amount indicated on the amount indication 17, cancels the proposed deposit transaction by key input operation, the bills inserted by the user and kept temporarily in stock in the transaction equipment are returned to the user by way of the return slot 24.

A slot 27 adjacent to the bill insertion slot 22 is for insertion of the passbook. The passbook insertion slot 27 is normally closed by a shutter, which opens in a predetermined timing in response to the user's selection of a transaction requiring the passbook. When the user opens the page of the passbook to be printed with data and inserts it into the slot 27, the passbook is taken into the equipment. The transaction data to be posted which has been transferred to the transaction equipment by communication with the host is printed on the passbook, and after completion of the printing, the passbook is discharged from the insertion slot 27.

Figure 2:
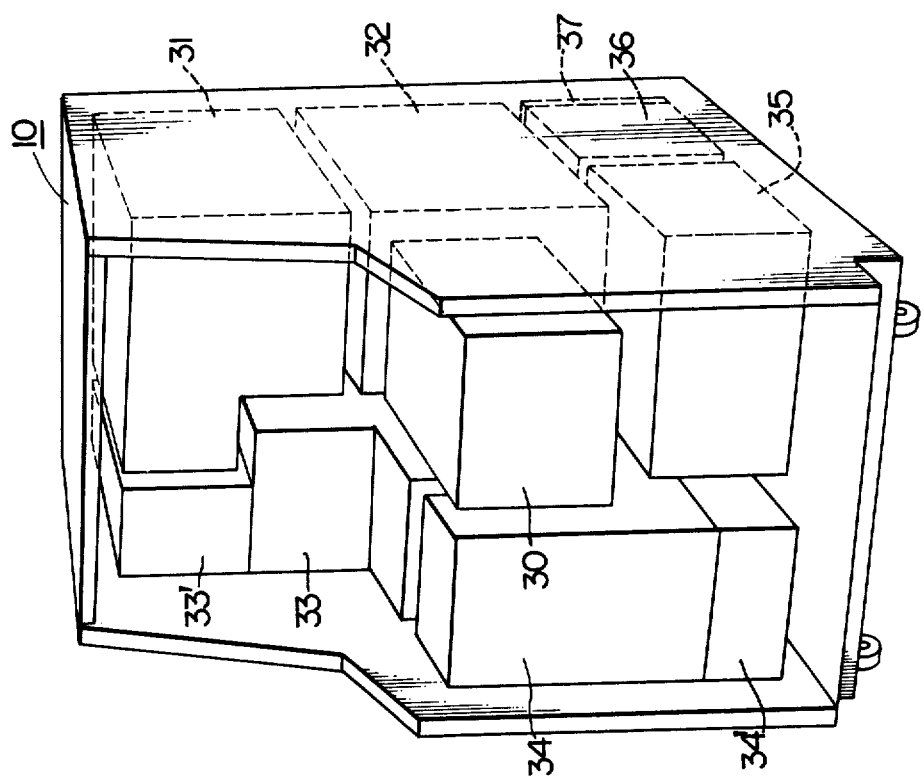
FIG. 2 is a diagram schematically showing the positions of the main component elements of the transaction equipment.

The internal structure of the transaction equipment 10, as shown in FIG. 2, comprises a user panel unit 30, a transaction medium processing unit 31, a cash issue unit 32, a deposited bill processing unit 33, a passbook processing unit 34, a power supply unit 35, and a control unit 36 having a control panel 37. The transaction medium processing unti 31 is subdivided into an ID card unit, a transaction statement unit and a transaction article discharge unit.

According to the present invention, the control unit 36 includes a programmable microprocessor. The deposited bill processing unit 33 and the passbook processing unti 34 include control units 33' and 33' respectively having exclusive programmable microprocessors for controlling the operation of the mechanisms of the respective units.

Next, the mechanical construction of the transaction equipment according to the present invention will be described more in detail.

Basic module

Figure 3:
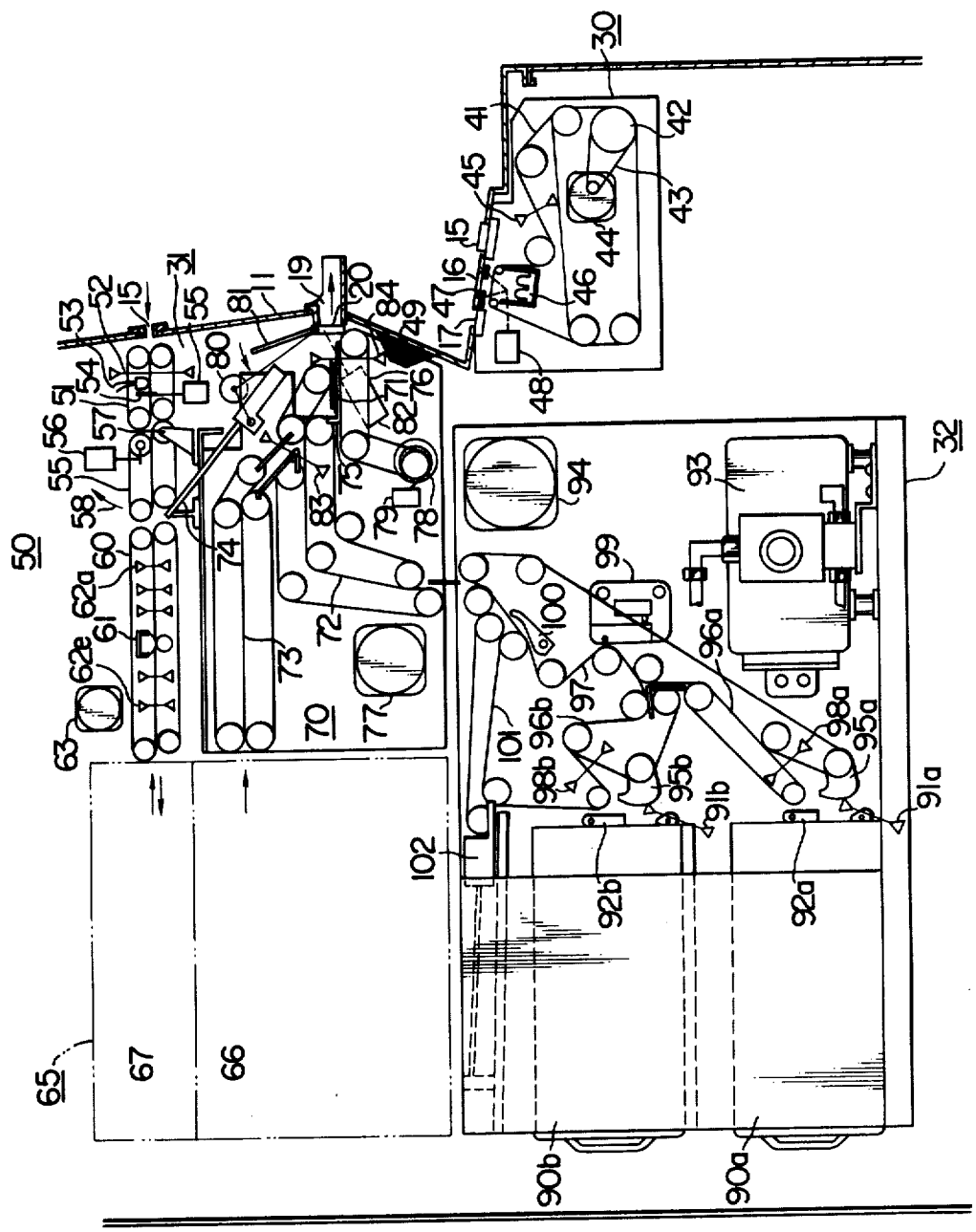
FIG. 3 is a side view showing the terminal units included in the basic module.

The construction of the user panel unit 30, the transaction medium processing unit 31 and the bill discharge unit 32 is shown in FIG. 3.

The user panel unit 30 includes an endless screen 41 with a plurality of written guidance informations and wound over a plurality of rollers, and a drive motor 44 coupled to the roller 42 through a belt 43. The screen 41 is made of transparent film and has a plurality of opaque stripes on the side edges thereof for detection of the positions of different pieces of written information. By providing the opaque stripes corresponding to respective binary digits, positions of written information in the number of, for example, $2^6=64$, are made available for designation. A sensor designated by reference numeral 45 is for detecting the absence or presence of the opaque stripes on the screen and includes as many sensors units as the stripes.

Assume that the written guidance information is designated by a 6-bit binary code. When the output of the sensor coincides with the designated code, the rotation of the screen is stopped to indicate the predetermined written guidance information on the window 16.

Numeral 46 shows a lamp for radiating the written guidance information opposite to the window 16 from the back side thereof. In the case where two different pieces of written information are recorded at the same position of the screen, only one of them may be indicated to the user by masking the other written invormation. Numeral 47 denotes a shutter for the purpose of such masking, which shutter is controlled by a solenoid 48. The written information recorded on the screen 41 includes the one for causing the user to select one of plural types of transactions handled by the versatile automatic transaction equipment according to the invention. Although the keys for entering the type of transaction selected by the user may be provided as ones exclusive to the purpose of entering the type of transaction desired, the present invention is such that certain ones of the keys 15 for entering numerical data are made to correspond to specific transactions in accordance with the written information to be displayed on the window 16, and through these keys, the user is caused to designate a specific transaction. In this way, the number of exclusive function keys is reduced. A speaker 49 located over the numeral indicator 17 inside of the panel 11 is for producing a sound in synchronism with user's key operation or at the time of changing the guidance.

The transaction medium processing unit 31 includes an ID card unit 50, a transaction statement unit 65 and an article delivery unit 70.

The ID card unit 50 is comprised of three transport passages driven by the motor 63. A first card transport passage 51 includes a photo-sensor 52 for detecting the insertion of the ID card inserted from the slot 15, a magnetic sensor 53 for detecting the presence of the magnetic stripe on the ID card, and a stopper 54 provided for preventing an article other than the ID card from being inserted into the transaction equipment and which is opened by the solenoid 55 in response to an output from the photo-sensor 52 and the magnetic sensor 53. A genuine ID card which has been inserted into the slot 15 is transferred to the second transport passage 55 by the first card transport passage 51 actuated by the insertion.

The second card transport passage 55 is for transferring the ID card from the first card transport passage 51 to the third card transport passage 60, and is adapted to be driven as shown about the supporting point 57 on the side of the first card transport passage as shown by arrow 58 upon energization of the solenoid 56. When the ID card is to be returned to the user, the solenoid 56 is energized, whereby the ID card transported from the third card transport passage 60 toward the card insertion slot 15 is redirected onto the descendant card transport passage of glacis 74.

The third card transport passage 60 includes a magnetic head 61 for reading and/or writing the customer data in the magnetic stripe of the ID card, and a plurality of photo-sensors 62a and 62d for detecting the position of the ID card in transit.

The turning effort of the motor 63 is transmitted in forward or reverse direction selectively to the third card transport passage 60 by a clutch not shown, thereby effecting reciprocation of the ID card. This enables repetitive reading operation in case of erroneous reading of the magnetic data on the one hand and repetitive reading of the data updated by writing to check for correct data recording on the other hand.

The transaction statement unit 65, whose detailed construction is not shown in the drawing, includes a mechanism 66 for printing transaction data on a continuous form of two parts, one for delivery to the user and the other for bank file, and a mechanism 67 for imprinting the emboss of the ID card used for the current transaction, on the bank file part of the form on which the transaction data has been printed.

The printing mechanism 66 includes a section for feeding the continuous forms stacked at a predetermined rate, a printer having a printing drum and a hammer for printing the transaction data on the forms, a stamp for printing special written information unable to be indicated by the printer, on that part of form to be delivered to the user, a cutter for cutting off the statement part to be delivered to the user, from the form, a transport passage for transporting the statement thus cut off to the transaction article discharge unit 70, and several sensors for detecting the remainders of the forms or positions thereof.

The imprint mechanism 67, on the other hand, includes a transport passage adapted to reciprocate in such a manner as to transport to the imprint station the ID card supplied from the third card transport passage 60 and to return the same ID card to the third card transport passage 60 after imprinting, an imprint roller adapted to roll over the surface of the continuous form laid on the ID card on the imprint station, a solenoid for rotating the roller, and several sensors for detecting the position of the ID card.

The transaction article discharge unit 70 includes a bill transport passage 72 for transporting to the stack section 71 the bills transported from the deposited bill processing unit 33, a transport passage 73 for transporting to the stack section 71 the user statement supplied from the printing mechanism 66, the card transport passage 74 for passing to the stack section 71 the ID card to be returned to the user, and a discharge transport passage 76 having a fork 75 for delivering to the return slot 19 the bills, statement and ID card stacked on the stack station 71. The bill transport passage 72 and the statement transport passage 73 are driven by the motor 77, and the discharge transport passage 76 by the motor 78. The motor 78 has the rotary shaft thereof coupled with an eccentric cam. By detecting the position of this cam by switch 79, the position of the fork 75 is detected indirectly.

The card transport passage 74 has the lower end thereoof adapted to be tilted by the solenoid 80 to cause the natural fall of the ID card. In response to the tilting of the passage 74, the holding plate 81 tilts from the shown position in the direction of arrow and holes the fallen ID card lightly together with the bills and statement already stacked on the stack section 71. The shutter 20 closing the discharge slot 19 is opened by the solenoid 82. The senser 83 is for detecting the passage of the statement from the transport passage 73, and the sensor 84 for detecting the presence or absence of the articles in the stack section 71.

Such being the construction, after the bills, statement and ID card are stacked in the stack station 71, the transaction discharge unit 70 opens the shutter 20 in a predetermined timing, so that by driving the discharge transport passage 76 by the motor 78, all the articles to be delivered to the user are placed in a condition ready to be delivered collectively.

The cash discharge unit 32 is so constructed that cassettes 90a and 90b respectively containing different classes or types of bills such as 10,000 yen and 1,000 yen bills are demountable from the back side of the transaction equipment proper. Whether or not the cassettes are mounted in position is detected by the cassette position detectors 91a and 91b respectively. In the cassettes, the bills are pressed by springs from behind toward a sucker 92a or 92b. Each cassette has a sensor for detecting whether the number of bills in the cassette is reduced below a predetermined level. The suckers 92a and 92b are supplied with vacuum pressure selectively via a change-over valve from the vacuum pump 93, so that while the suckers are in swinging motion, the bills adsorbed to the suckers are recovered out of the cassettes one by one. The swinging motion of the suckes 92a and 92b is performed at predetermined regular intervals by the turning effort of the motor 94 transmitted through a mechanism (not shown) including a belt, a clutch and a cam. Also, the casseettes are so designed that a vacuum adsorption hole stops at a predetermined position opposed to the bills in each of the cassettes at the time of stoppage of operation, by detecting a position mark attached to the rotary cam.

The bills taken out of the cassette 90a by the sucker 92a are introduced to the transport passage 96a by the notched roller 95a rotating in synchronism with the sucker 92a, and supplied to the bill transport passage 72 through the transport passage 97.

The bills taken out of the cassette 90b by the sucker 92b, on the other hand, are introduced into the transport passage 96b by the snatch roller 95b rotating in synchronism with the sucker 92b, and through the transport passage 97, sent to the transport passage 72.

At the inlets of the transport passages 96a and 96b are arranged the sensors 98a and 98b for detecting the passage of the bills respectively. In response to the outputs of the sensors 98a and 98b, the number of the bills taken out of the cassettes are counted on the one hand and any faulty operation of the suckers 92a and 92b is detected on the other hand. Further, a sensor 99 for detecting any bills taken out in overlapped condition is located in the course of the transport passage 97. When these sensors detect any overlapped condition of two or more bills or any continuous or abnormal vicinity of successive bills, the reject gate 100 is actuated, so that the bills in abnormal transport condition are separated into the transport passage 101 and recovered by the recovery box 102.

All of the transport passages 96a, 96b, 97 and 101 are driven by the motor 94.

The mechanical units shown in FIG. 3, together with the control unit 36, constitute a basic module of the transaction equipment according to the invention, and the operation of each of the units is controlled by the control unit 36.

Deposit module

Figure 4:
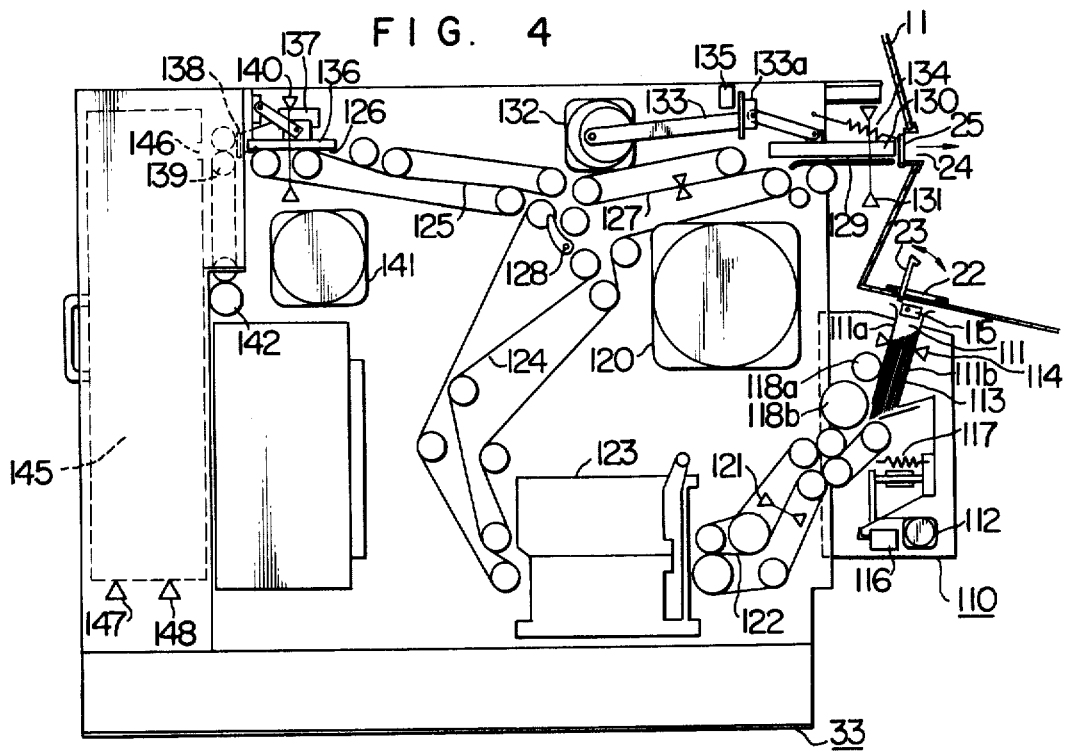
FIG. 4 is a side view showing the configuration of the terminal units included in the depository sub-module.

The configuration of the deposited bill processing unit 33 is shown in FIG. 4. This unit is located under the bill insertion slot 22 and includes a bill receiving mechanism 110 having a hopper 111 into which bills the user wishes to deposit are adapted to be loaded at a time. The hopper 111 includes a fixed front plate 111a and a longitudinally movable back plate 111b. These plates are in contact with each other in deposit stand-by state. At the time of the start of the depositing operation, the starting of the motor 112 causes the back plate 111b to move to a predetermined rear position thereby to form a space between it and the front plate 111a for receiving bills to be deposited. The cover 23 closing the bill insertion slot 22 opens as shown by the action of the spring upon disengagement of the hook thus far engaged with the forward end thereof, at the time of moving of the back plate 111b. The user, after setting the bills 113 in the hopper 111, closes the cover 23. When the presence of the bills in the hopper 111 is detected by the sensor 114 and the closing of the cover 23 is detected by the sensor 115, then the hook that has thus far engaged the front plate 111b at the rear position thereof is disengaged by the solenoid 116, so that the back plate 111b is moved forward by the action of spring 117 and presses the bills 113 against the recovery rollers 118a and 118b.

The recovery rollers 118a and 118b, to which the turning effort of the transport motor 120 is transmitted through a clutch not shown, rotate and take out the bills one by one from the hopper 113. The bills thus taken out of the hopper 111 are supplied to the transport passage 122 including the sensor 121 for counting the number of the bills.

The bills sent to the transport passage 122 are passed to the bill verifier 123. The bill verifier 123 includes a transport passage, a plurality of photosensors arranged in opposition to the transport passage and a magnetic sensor. The bill verifier 123 with this configuration detects the print brightness pattern and the magnetism distribution pattern contained in the printing ink of the bills and collates these patterns with reference patterns of a genuine bill provided in advance, thereby determining whether the bills are genuine or not and the types thereof. On the basis of the result of verification by the verifier 123, the total amount of the deposit concerned is calculated.

The genuine bills that have passed the verifier 123 are temporarily stacked in the stack section 126 through the transport passages 124 and 125. The bills rejected by the verifier 123, on the other hand, are distributed into the transport passage 127 by the reject gate 128 at the end of the transport passage 124 and sent into the return tray 129. The transport passages 122, 124 and 127 are driven by the motor 120, while the transport passage 125 is driven by the motor 141. The return tray 129 receives the bill or bills to be returned, in a space formed with the holding plate 130. The presence or absence of bills in the return tray 129 is detected by the sensor 131. When the absence of bills in the hopper 111 is detected by the sensor 114, the total deposit amount is indicated on the amount indicator 17 shown in FIG. 1. At the same time, any bills which may be present in the return tray 129 are pushed forward while held between the return tray 129 and the holding plate 130 by the operation of the return tray drive motor 132, so that the shutter 25 normally keeping the return slot 24 closed by the spring 134 is pushed down, thereby projecting the end of the bills out of the front panel 11. The return tray 129 and the holding plate 130 have the central portions thereof partially notched, and the user may use the notches to pick out the bills returned. Upon detection by the sensor 131 of the user having pulled out the return bills, the motor 132 rotates in the reverse direction until the sensor 135 detects that the joint 133a of the arm 133 connecting the motor 132 and the holding plate 130 has reached a predetermined position. With the backward movement of the holding plate 130, the shutter 25 is pulled up by the spring 134 and closes the return slot 24.

The stack section 126 is formed between the transport passage 125 and the holding means 136, and positioned forwardly of the insertion slot 146 for the safe 145 for keeping the deposited bills in stock. Between the insertion slot 146 and the stack section 126 are transport rolles 139 and a stopper 138 whose opening and closing operation is controlled by the solenoid 137. Numeral 140 denotes a sensor for detecting the presence of a bill or bills in the stack section 126.

The stopper 138 is normally closed, so that the bills transported to the transport passage 125 are stopped by the stopper 138 and stay in the stack section 126. After the bills in the hopper 111 are all processed and the user approves the processing of the deposit in the amount indicated on the amount indicator 17, the solenoid 140 is energized to open the stopper 138, with the result that the bills that stay in the stack section 126 are taken into the safe 145 through the rollers 139 driven by the turning effort transmitted from the motor 141 through the clutch 142.

If the user disapproves the deposit in the amount indicated on the amount indicator 17, on the other hand, the motor 141 rotates reversely, so that the bills in the stack section 126 are passed to the return tray 129 through the transport passages 125 and 127 and returned to the user by way of the return slot 24.

The safe 145 has a bill-receiving plate (not shown) supported by a spring, which plate gradually falls by the weight of the bills. The fall of the bill-receiving plate to the lowest point is detected by the sensor 147 under the safe 145, thus indicating that the safe is filled up with bills. Another sensor 148 under the safe 145 is for detecting whether or not the safe 145 is mounted in position.

The mechanical units for deposit processing described above, together with the control circuit 33' including an exclusive programmable data processor, constitute a sub-module (hereinafter referred to as the depository or deposit module) and are controlled by the same control circuit 33' independently of the mechanical units making up the basic module.

Printer module

Figure 5:
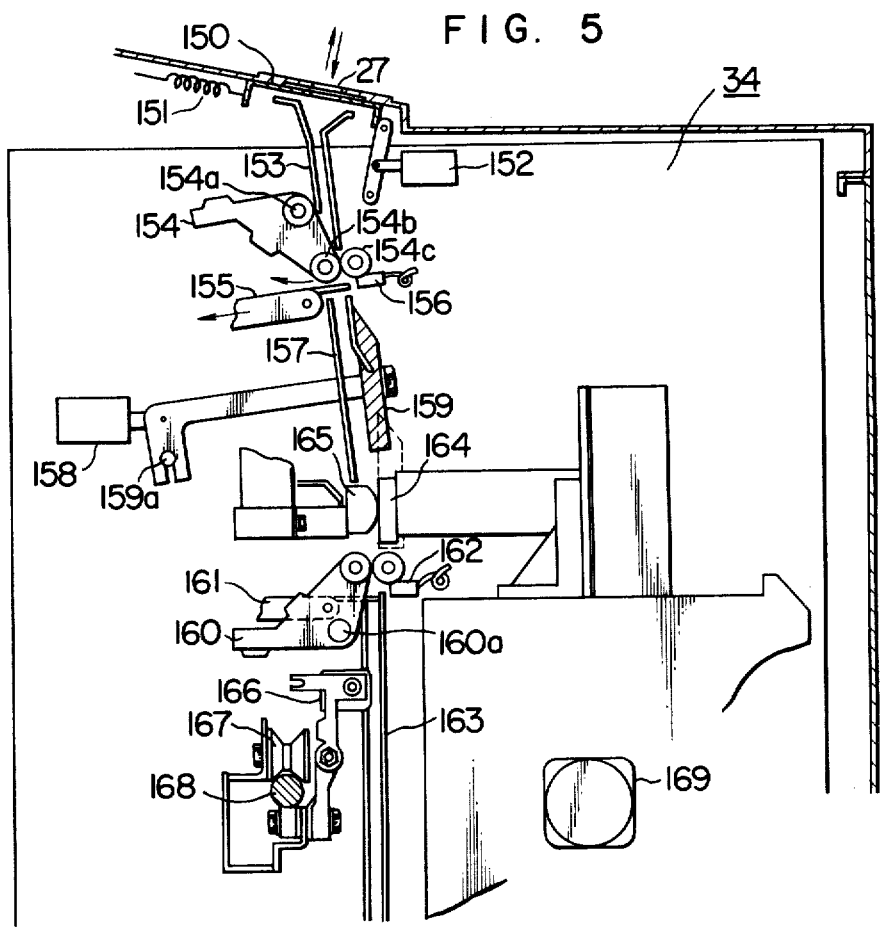
FIG. 5 is a side view showing the configuration of the terminal units included in the passbook-processing sub-module.

The construction of the essential parts of the passbook processing unit 34 is shown in FIG. 5. The passbook insertion slot 27 is normally closed by the shutter 150. The opening and closing operations of the shutter 150, with an end thereof pulled by the spring 151, is controlled by the solenoid 152 coupled to the other end thereof. Under the passbook insertion slot 27 are located a first passbook guide 153, a first pressure roller 154 rotatable about the supporting point 154a, a passbook stopper 155 and a sensor 156 for detecting passbook insertion. When the passbook insertion slot shutter 150 is open, the first pressure roller 154 is in a position rotated in the direction shown by arrow in the drawing to receive the passbook. Upon detection of passbook insertion by the sensor 156, the first pressure roller 154 is repositioned in such a manner as to hold the passbook between the driving roller 154b and the follower roller 154C as shown in the drawing. Under this condition, the first stopper 155 is pulled in the direction of arrow by a solenoid not shown, and permits the passbook to enter an internal transport passage including the second passbook guide.

The internal transport passage includes a guide 159 movable up and down about the supporting point 159a by the solenoid 158, a second pressure roller 160 similar to the first pressure roller 154 and rotatable about the supporting point 160a, a second stopper 161 for stopping the passbook under the second pressure roller 160, a second sensor 162 for detecting the passbook at the position of the second stopper 161, and a third passbook guide 163 under the second stopper 161.

Between the second guide 157 and the second stopper 161 are arranged a printing head 164 and a platen 165 in opposed relation to each other which are movable in the horizontal direction to print data on the passbook. At the time of passbook insertion, the printing head 164 and the platen 165 are in laterally spaced relation to each other, so that the passbook is guided by the movable guide 159 moving down to the position shown by a dotted line.

Under the second stopper 161, a magnetic head 166 is provided for reading and/or writing the data in the magnetic stripe horizontally attached to the front of the passbook. The magnetic head 166 includes a roller 167 and vertically (in the drawing) reciprocates along the rod 168. Incidentally, the first pressure roller 154, second pressure roller 160, the printing head 164 and the magnetic head 166 are all selectively driven by the motor 169.

The passbook processing unit 34 with the above-mentioned construction is operated as described below. When the passbook insertion slot shutter 150 is opened, the first and second pressure rollers 154 and 160 immediately move to open the way for the passbook. When the user inserts the passbook with the page thereof to be printed open, the sensor 156 detects the passbook. The first stopper 155 is opened, and the first pressure roller 154 moves to close the way for the passbook, thus passing the passbook to the second guide 157. Under this condition, the printing head 164 and the platen 165 are laterally spaced from each other, so that the movable guide 159 moves down to the lower position thereof, thus forming a passbook transport passage with the second guide 157. When the lower end of the passbook is brought into contact with the second stopper 161, the passbook is detected by the second sensor 162. In response to the output of the sensor 162, the second stopper 161 opens while the second pressure roller 160 is closed.

In view of the fact that the magnetic stripe attached to the front of the passbook is distant from the lower end of the passbook by a predetermined length, the second pressure roller 160 operates to pass the passbook further downward by the predetermined length, thus bringing the magnetic stripe to the position in registration with the magnetic head 166. At this position, the passbook is stopped and the magnetic head 166 is moved horizontally, thereby reading data from the magnetic stripe. This data contains instructions as to which line to begin the passbook printing with. Upon reading the magnetic data, therefore, the second pressure roller 160 is operated again in such a manner as to bring the printing-start line in registration with the printing head 164.

After the passbook is placed in position, the movable guide 159 moves up as shown in the drawing, and platen 165 and the printing head 164 approach to each other, so that the printing head 164 moves horizontally to print the data. In the case where a plurality of lines are printed, the second pressure roller 160 brings the passbook in registration with the printing head 164 for each line to be printed. Upon completion of data printing, the second pressure roller 160 passes the passbook to bring the magnetic stripe in registration with the magnetic head 166, so that the magnetic head 166 updates the magnetic stripe data to record the next printing-start line in the magnetic stripe. The printing head 164 and the platen 165 are spaced again, and the movable guide 159 is relocated to its lower position. The passbook that has been updated is transported upward by the second pressure roller 160 and the first pressure roller 154, and the forward end thereof projected out of the insertion slot 27. When the first sensor 156 detects that the user has pulled out the passbook, the solenoid 152 frees the shutter 150. The spring 151 causes the shutter 150 to close the insertion slot 27, and the pressure rollers 154, 160, the movable guide 159 and the stoppers 155, 161 are restored to the original positions thereof.

The passbook processing unit 34 described above, together with a control circuit 34' including an exclusive programmable data processor, constitutes another submodule (hereinafter referred to as the printer module), and its operation is controlled by the control circuit 34' independently of the mechanical units of the basic module and the depositing module.

Control panel

Figure 6:
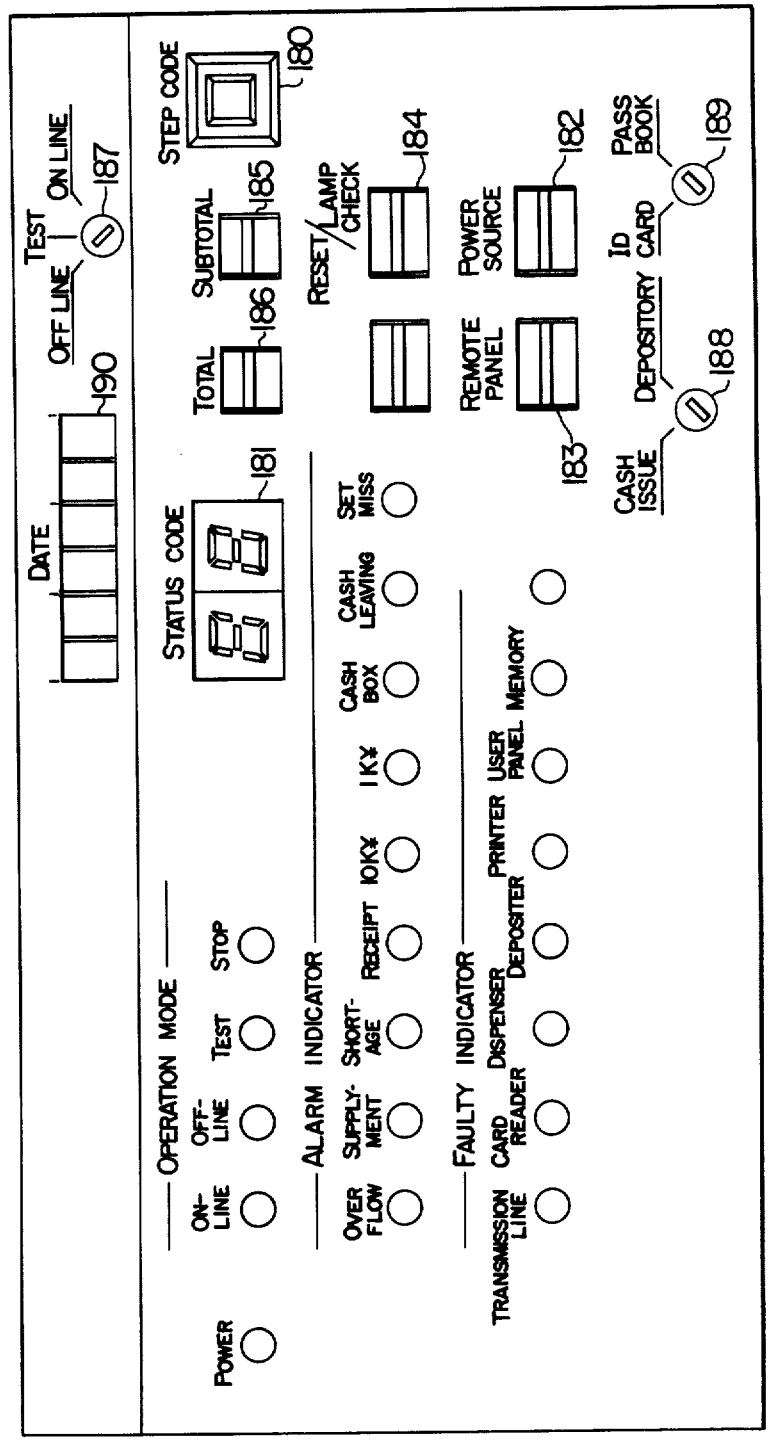
FIG. 6 is an outside view of the control panel.

The control panel 37 incorporated in the control unit 36 is shown in FIG. 6. The control panel 37, as shown in the figure, include a plurality of indication lamps for indicating the condition of power supply, the operating mode of the transaction equipment, types of alarm and points of fault, a step code indicator 180 for indicating the progress of a transaction in the presence of an abnormality of the transaction equipment, and a status code indicator 181 for indicating the nature of the fault. The control panel 37 also includes several switches for controlling the operation of the transaction equipment. Nuemral 182 denotes a power switch, numeral 183 a switch for connection with a remote panel to serve a bank clerk remote from the transaction equipment, and numeral 184 a reset switch for resetting the operating condition to the original state for checking the indication lamps on the control panel from their normality or for restarting the transaction equipment suspended in operation in the course of a tranaction. Numeral 185 denotes a switch for printing the subtotal data including the number of transactions and amount thereof on the voucher, and numeral 186 a switch for printing the total data including the number of transactions and amount thereof on the voucher. The control panel 37 further includes switches for switching the operating modes of the transaction equipment by the bank clerk in charge only by an exclusive key. The switch 187 is for selecting the operating modes including the ON LINE mode in which the transaction equipment is operated in connection with the host computer, the OFF LINE mode in which the transaction equipment is operated independently of the host computer, and the TEST mode in which the operation of the transaction equipment is tested. The switches 188 and 189 are for designating the types of transactions handled by the transaction equipment. Numeral 190 shows a date setter.

According to the present invention, the programmable microprocessor included in the control unit 36 enlarges or reduces the transaction functions in accordance with the conditions of switches 188 and 189. In other words, when all the modules are ready for normal operation, the swtich 188 on the control panel is set to DEPOSITORY, and switch 189 to BANK BOOK, thus rendering the transactions of all the modules executable.

If the depositing module is in fault, the switch 188 is closed on CASH ISSUE, so that the transaction equipment is operated with a smaller number of the types of transactions lacking the depositing module. In this case, the user guiddance indicator 16 or the indicator 12 on the front panel of the transaction equipment changes the indication thereon in a manner to inform the user that the types of transactions handled by the transaction equipment are reduced in number. In the case where a fault of the printer module developes, the switch 189 is closed on ID CARD, whereby the transaction equipment is operated without permitting the use of the passbook. In the even that both sub-modules are faulty at the same time, the transaction equipment according to the invention functions merely as a cash dispenser only with the basic module.

It will be noted from the foregoing description that in the transaction equipment according to the present invention, in the case of a fault of part of the equipment, the faulty module is selectively isolated, so that the transaction equipment is operated only with the active functions of the remaining modules. This is equivalent to say that the transaction equipment according to the present invention may be started with a system configuration comprising only the basic module functioning as a cash dispenser, followed by addition of the sub-modules for enalrging the functions of the transaction equipment.

Next, the outline of the programs executed by the three microprocessors of the equipment according to the invention will be explained.

Program structure

Figure 7:
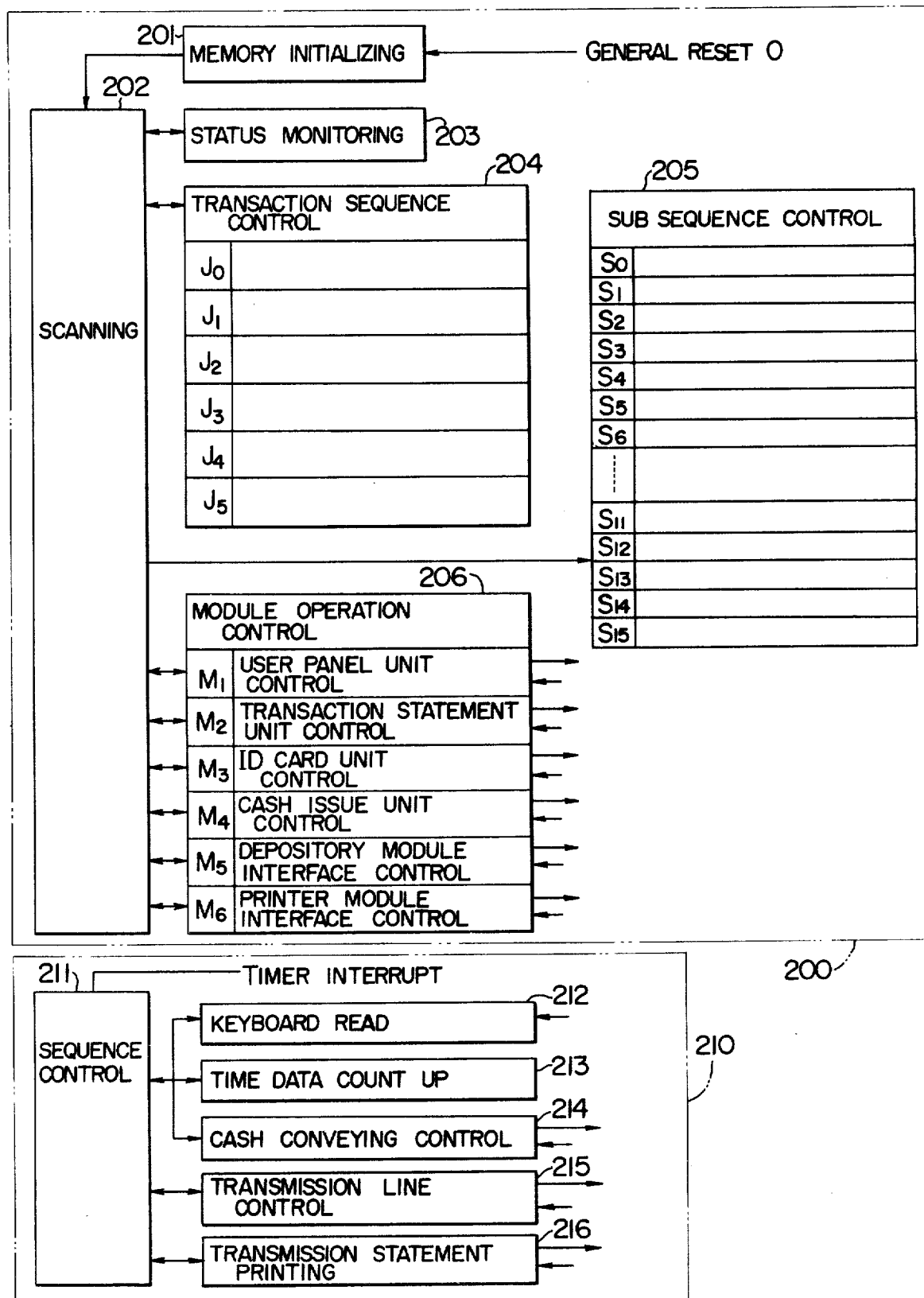
FIG. 7 is a block diagram schematically showing the configuration of the program executed by the basic module.

The microprocessor included in the basic module executes the programs 200 and 210 shown in FIG. 7.

The programs 200 comprise: a program 201 for restoring the program condition to initial state for memory initialization in response to GENERAL RESET 0 signal generated when the POWER SOURCE switch 182 on the control panel 37 is turned ON or the switch 184 is closed on RESET; a scanning program 202; and sub-programs 203 to 206 sequentially executed by the scanning program 202.

The sub-program 203 is for monitoring the condition of the transaction equipment, which by monitoring the conditions of the control panel and the user panel, selects the operating mode of the transaction equipment and the type of transaction to be executed on the basis of the information on the equipment conditions, and in the presence of any abnormality of the transaction equipment, causes the operation of the transaction equipment to stop.

The sub-program 204 is for showing the operation sequence of the transaction equipment, and includes the six transaction sequence control program $J_0$ to $J_5$ described below.

$J_0$: Sequence of cash payment transaction without use of the passbook $J_1$: Sequence of cash payment transaction using the passbook $J_2$: Sequence of depositing transaction without using the passbook $J_3$: Sequence of depositing transaction using the passbook $J_4$: Sequence of transaction for referring to the balance standing on the user account $J_5$: Sequence of transaction for posting the unposted transaction data in the passbook without cash payment or depositing.

Figure 8:
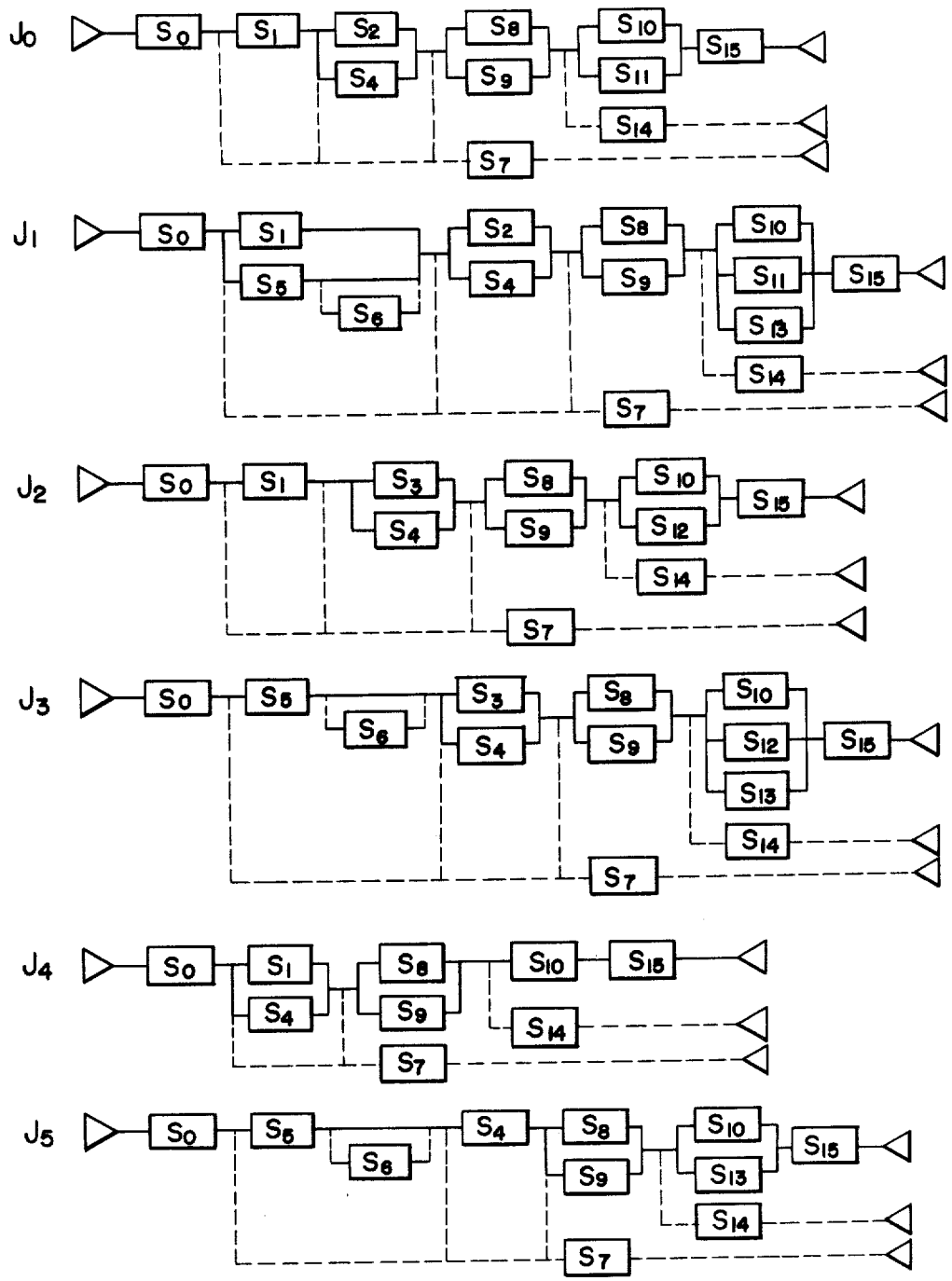
FIG. 8 is a block diagram showing a configuration of the transaction sequence program.

The transaction sequence control programs $J_0$ to $J_5$ contain the description for selectively executing the subsequence control programs $S_0$ to $S_{15}$ in the subprogram 205, in the combinations and orders according to the transaction involved as shown in FIG. 8.

The subsequence conrol programs $S_0$ to $S_{15}$ make up part of a series of operating sequences required of the transaction equipment, whereby the transaction equipment performs the operations mentioned below.

$S_0$: Initial processing, wherein the user is instructed to insert the ID card or passbook in accordance with the type of transaction required, the magnetic recoded data is read from the ID card, or a faulty card is returned.

$S_1$: ID number collation, which include such operations as instructing the user to enter the ID number, collating the entered ID number with the ID number read from the ID card, and, of required, instructing the user again to enter the ID number, returning the ID card or accepting the ID card in accordance with the result of collation.

$S_2$: Entering of the amount to be paid, which includes such operations as instructing the user to enter the amount to be paid, reading the amount data, indicating the amount read, and instructing the user to confirm the indicated amount.

$S_3$: Depositing, which includes such operations as instructing the user to insert the bills to be deposited, accepting the bills, indicating the deposited amount counted by the transaction equipment, instructing the user to approve or disapprove the amount, and returning the bills if required.

$S_4$: Central communication preprocessing, which includes such operations as printing part of the data on the transaction statement prior to the communication with the host computer, and updating of the ID card magnetic data.

$S_5$: Passbook data reading, which includes the operation of reading the magnetic data from the magnetic stripe attached to the passbook.

$S_6$: Passbook reinsertion, which includes such operations as instructing the user to reinsert the passbook inserted erroneously, returning and reaccepting the passbook and reading the magnetic data.

S$_7$: Cancellation of transaction before central communication, which includes the operations of instructing the user to restart the procedures, discharging the articles to be returned to the user, out of the equipment, and initializing the transaction sequence, in the case where an abnormality is found before communication with the host computer.

S$_8$: Printing of the transaction statement, which includes the operation of printing part of unposted data on the statement during communication with the host computer.

S$_9$: Central communication, which includes the operations of sending the data on the current transaction including the account number, type of transaction and amount to the host computer through a communication channel, and receiving an answer approving or disapproving the transaction with reference to the customer account file maintained in the host computer.

S$_{10}$: Post-processing of the transaction statement, which includes such operations as printing the remaining unposted data on the transaction statement, separating the statement to be delivered to the user, from the continuous form, imprinting the data embossed on the ID card, and transporting the ID card and the separated statement.

S$_{11}$: Bill delivery, which includes the operation of recovering the bills from the bill cassettes.

S$_{12}$: Storing the deposited bills in the safe, which includes the operation of storing in the safe the bills which have thus far been kept in stock temporarily at the inlet of the safe.

S$_{13}$: Passbook printing, which includes such operations as passbook line registration, posting data in the passbook, updating the data in the magnetic stripe of the passbook, etc.

S$_{14}$: Transaction cancellation after communication with host, which includes the operation of discharging or recovering out of the equipment the ID card, bills, statement or passbook in accordance with the rature of the disapproval of the host on the proposed transaction.

S$_{15}$: Article discharge, which includes such operations as discharging the articles including ID card, statement, bills and/or passbook to be delivered to the user, out of the equipment, instructing the user to receive them, confirming that the user has received them, and restoring the equipment to the condition before the transaction.

Subprogram 206 is for controlling the module operations, and includes the program M1 for controlling the user panel unit, program M2 for controlling the transaction statement unit, program M3 for controlling the ID card processing unit, program M4 for controlling the cash discharge unit, program M5 for controlling the deposit module interface, and program M6 for controlling the printer module interface.

According to the present invention, the subprograms 203 to 206 are scanned sequentially by the scanning program 202 and executed as mentioned below to perform the transaction selected by the user.

When the transaction equipment is in stand-by state, the written information for causing the user to select the type of transaction is indicated on the guidance indicator. The types of transaction available for selection by the user depend on the conditions of the switches 187 to 189 on the control panel.

When the user designates a transaction by way of the keyboard, the status monitoring program 203 gives an execution command to one of the transaction sequence control programs J$_0$ to J$_5$ which corresponds to that particular transaction. Specifically, when a flag bit is assigned on the storage area provided on the data storage corresponding to the programs J$_0$ to J$_5$, so that when the particular storage area is scanned by the scanning program 202, the program associated with the flag bit is executed. In the course of execution of the transaction sequence control program 204, a flag bit for execution command is supplied to one or a plurality of sub-sequence control programs S$_0$ to S$_{15}$ to be executed. This flag bit is erased by the sub-sequence control programs themselves upon completion of execution of the sub-sequence. Upon erasure of the flag bit by the sub-sequence control program, therefore, the transaction sequence control program gives a flag bit to the next sub-sequence control program to proceed with the transaction sequence.

Figure 9:
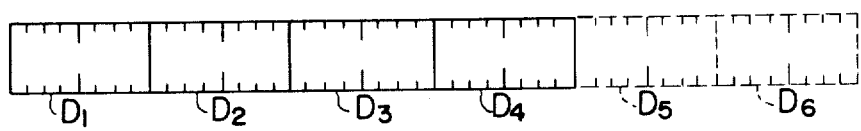
FIG. 9 is a diagram showing an example of data format used for the basic module execution program.

In the course of execution of the sub-sequence control programs S$_0$ to S$_{15}$, a flag bit for execution command and data representing what is to be executed by these programs (hereinafter referred to as the task data) are selectively applied to the module operation control programs 206 (M1 to M6). This task data comprises a plurality of bytes and assumes the data format as shown in FIG. 9. The first byte D1 includes the code showing the classification of the module operation control programs (M1 to M6) to which the task data is applied; the second byte D2 the numeral showing the length (number of bytes) of the task data; the third byte D3 the start mark indicating that the task mark follows; and the fourth to sixth bytes D4 to D6 task codes showing the substance of the task. In the case where tasks are applied continuously to one of the module operation control programs, for example, M1, the bytes D4 to D6 are followed by one task data, which is in turn followed by data of several bytes including the start mark and other task codes.

Upon execution of the module operation control programs M1 to M4 all of which are for controlling the mechanical, electrical or electro-mechanical terminal units included in the basic module, the task code is decoded, so that the microprocessor applies the address data for designating the terminal component elements and the control data indicating the operation of the terminal component elements to the terminal unit control circuit. As a result, the terminal units perform predetermined operations on the one hand and the data representing the status of the terminal units is read by the microprocessor on the other hand.

Upon execution of the module operation control program M5 or M6, in contrast, the microprocessor applies a control signal to the module interface, thereby actuating the control unit of the basic module in such a manner that these programs transmit the task data from the sub-sequence control programs to the programmable microprocessor of the submodule.

The module operation control programs M1 to M6 confirm the response from the terminal units or submodule each time they are scanned by the scanning program, and erase their respective flag bits when the tasks assigned are completed. The sub-sequence control programs apply the next data to one of the programs M1 to M6 according to the sub-sequence after the flag bits are applied to the module operation control programs by the subsequence control programs. By repeating such processes, each mechanical unit performs the oepration according to the sub-sequences.

Another program 210 shown in FIG. 7 is processed in priority to the program 200 in response to the interruption signal generated periodically by a timer means. The program 210 comprises the subprogram 212 for reading the data from the keyboard, the sub-program 213 for counting up the time data making up a reference for time monitoring, the sub-program 214 for controlling the bill transport in the bill discharge unit, the sub-program 315 for controlling the communication with the host computer, the sub-program 216 for controlling the printing of data on the transaction statement, and the sequence control program 211 for controlling the sequence of execution of these sub-programs.

Figure 10:
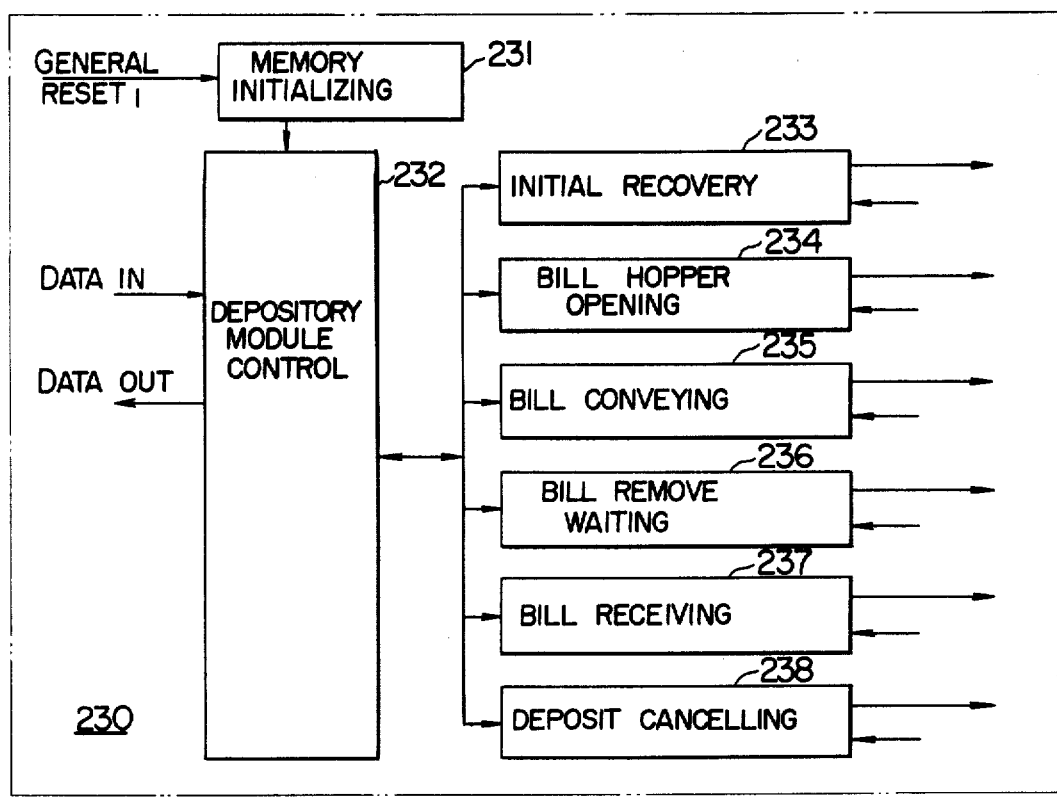
FIG. 10 is a block diagram schematically showing a configuration of the program executed by the depository sub-module.
Figure 10:
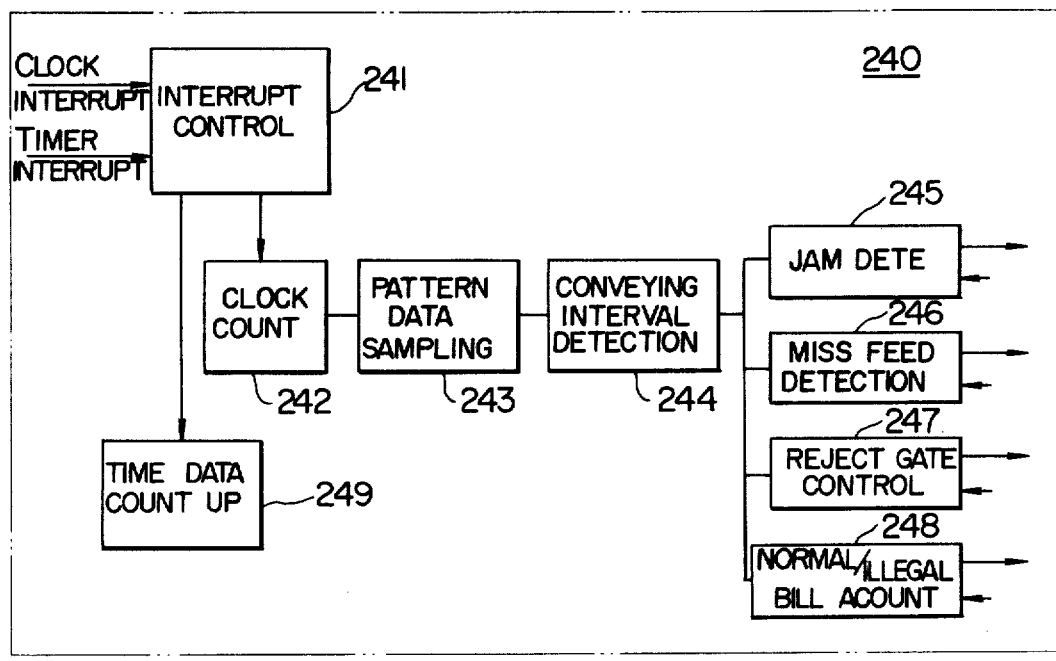

The microprocessor included in the depositing module is for executing the two programs 230 and 240 as shown in FIG. 10.

The program 230 includes: the memory initialize program 231 for restoring the program condition to initial state in response to the GENERAL RESET 1 signal generated from the basic module when the POWER SOURCE switch or RESET switch is turned on; the depositing module control program 232 for cotnrolling the data transmission and receipt communication with the basic module through the depository interface, and receiving and decoding the task data applied from the basic module; and the sub-programs 233 to 238 for controlling the mechanical or electrical terminal units selectively actuated by the program 232 on the basis of the results of decoding. The sub-program 233 is for restoring the depository unit to the initial condition; the sub-program 234 is for controlling the mechanisms related to the opening of the bill insertion slot; the sub-program 235 is for controlling the mechanism for taking in the bills, one by one, which have been fed into the hopper; the sub-program 236 is for controlling the mechanism for returning and causing to reinsert the rejected bills; the sub-program 237 is for controlling the mechanism for storing the deposited bills in the safe; and the sub-program 238 is for controlling the mechanism for returning the bills upon cancellation of the proposed deposit transaction.

The program 240 which is processed in priority to the program 230, on the other hand, includes the programs 242 to 248 processed by interruption of the clock pulses produced in synchronism with the transfer speed of the bill transport passages; the program 249 for counting up the time data representing the reference time for time monitoring and which is processed by interruption of clock pulses generated by the timer means at predetermined regular intervals of time; and the interrupt control program for analyzing the above two types of causes of interruption and for determining the program to be executed, in accordance with the type of cause of the interruption.

The program 242 is for counting clocks providing a reference for calculation of the distance covered by the bills; the program 243 is for verifying the authenticity and type of the bills on the basis of the pattern information collected from the bills; the program 244 is for detecting the space between the bills in transit; the program 245 is for detecting any jammed bill on the transport passages; the program 246 is for detecting any failure to recover a bill from the hopper; the program 247 is for controlling the reject gate for separating the false bills toward the return slot; and the program 248 is for counting the number of bills. The programs 245 to 248 are sequentially controlled by the interrupt control program 241 in such a manner as to be executed once every four clock interruptions.

According to the present invention, the deposit module control unit 232 decodes the task data generated from the basic module as a result of execution of the module operation control program M6, and starts the associated terminal unit control programs 233 to 238. By execution of these control programs, the deposit module microprocessor applies control data to the terminal units, and reads the status data from the terminal units thereby to cause them to perform the predetermined operations.

Figure 11:
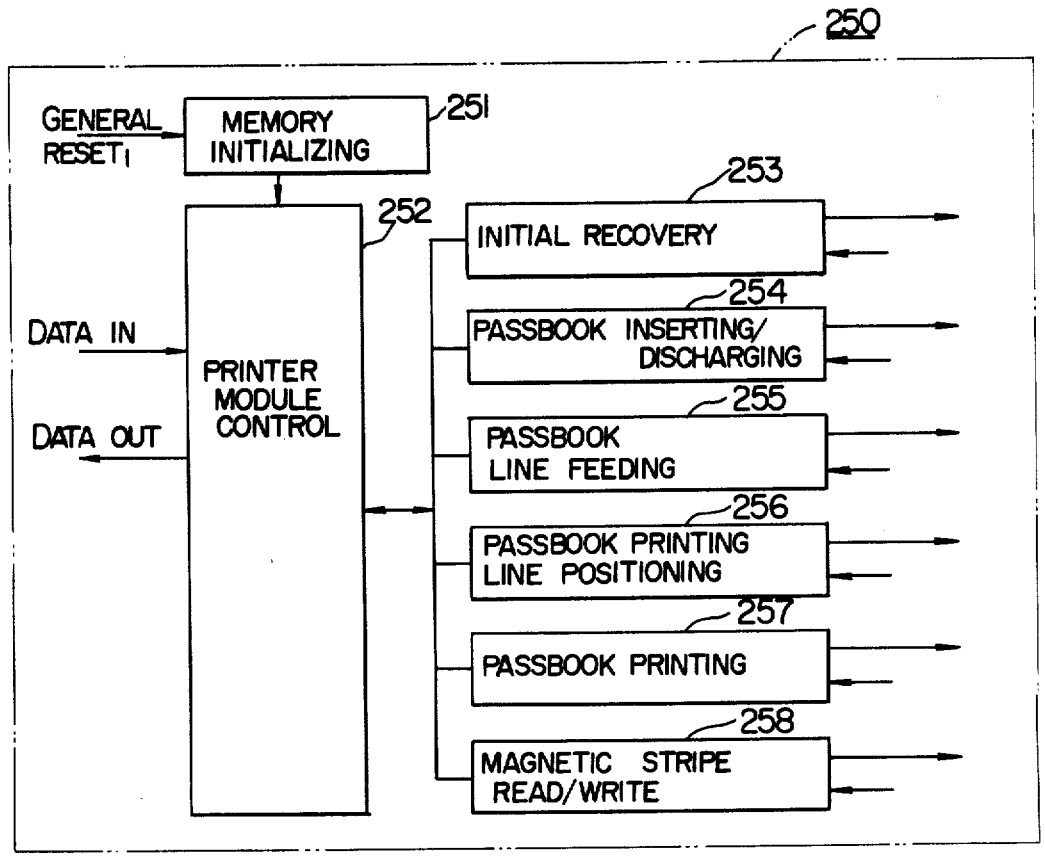
FIG. 11 is a block diagram schematically showing a configuration of the program executed by the passbook-processing sub-module.
Figure 11:
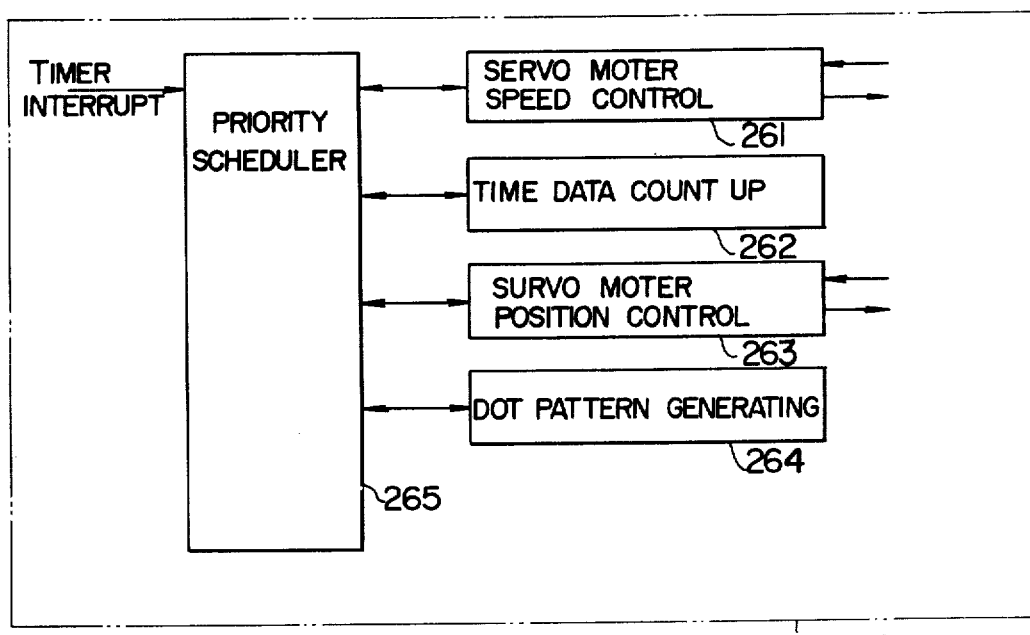

The program executed by the microprocessor of the printer module includes the programs 250 and 260 shown in FIG. 11.

Program 250 includes: the memory initialize program 251 for restoring the program condition to initial state in response to the GENERAL RESET 1 signal supplied from the basic module when the POWER SOURCE switch or the RESET switch is turned ON; the printer module control program for controlling the data transmission to and receipt from the basic module through the printer interface, and for decoding the task data received from the basic module; and the sub-programs 253 to 258 to controlling the mechanical, electrical or electro-mechanical terminal units actuated by the program 252 in accordance with the results of decoding.

The sub-program 253 is for restoring the printer unit to initial state; the sub-program 254 for controlling the operation of introducing into the equipment the passbook inserted from the insertion slot or the operation of discharging the passbook in the equipment out of the insertion slot; the sub-program 255 for controlling the operation of feeding the passbook each time of data printing; the sub-program 256 for controlling the operation of feeding the passbook to a position where the starting line for printing in the passbook is in registration with the printing head; the sub-program 257 for controlling the operation of data printing in the passbook by the printing head; and the sub-program 358 for controlling the operation of reading the magnetic data in the magnetic stripe of the passbook and writing therein new magnetic data.

The program 260, on the other hand, is one which is executed in priority to the above-mentioned program 253 at regular intervals of time in response to an interrupt clock pulse generated by the timer means, and comprises the sub-program 261 for controlling the rotational speed of a servo-motor which provides motive power for transporting the passbook, the magnetic head and the printing head, the sub-program 262 for count-up operation of the counter acting as a timer, the sub-program 263 for controlling the servo-motor in such a manner as to stop it at a predetermined angular position, the sub-program 264 for converting the printing information supplied from the host computer, into a dot driving signal for the printing head, and the sequence control program 260 for executing the sub-programs 261 to 264 sequentially.

Configuration of control system

Figure 12:
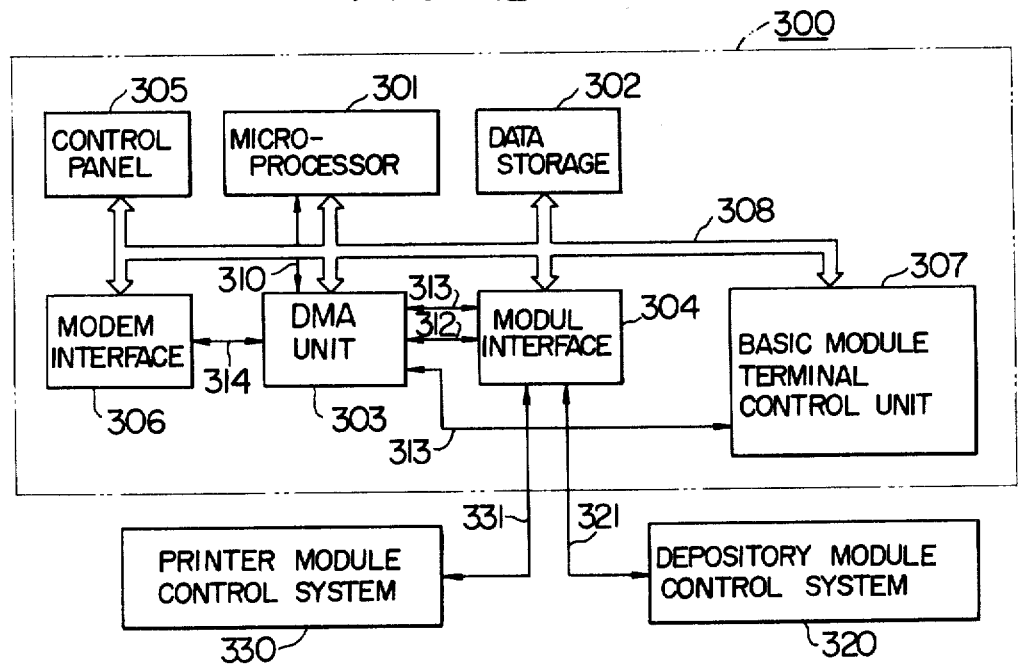
FIG. 12 is a block diagram showing a general configuration of the control system of the transaction equipment according to the present invention.

A general configuration of the control systems for controlling the operations of the transaction equipment according to the present invention is shown in FIG. 12. The control system comprises a basic module control system 300, a depository module control system 320, and a printer module control system 330.

The basic module control system 300 comprises a microprocessor 301; a data storage 302 including a random access memory (RAM) for storing various data and a read only memory (ROM) for storing the programs shown in FIG. 7; a direct memory access (DMA) control unit 303; a module interface unit 304 for communication with the subcontrol systems; a control panel control unit 305; a MODEM interface unit 306 for communication with the host computer; a bsic module terminal control unit 307; and an information bus 308 for interconnecting these components.

The information bus 308, which is shown by one line in FIG. 12, actually comprises a control bus 308a including address signal lines for transmitting 8-bit or 16-bit address data for specifying the input device and control lines for transmitting the input-output control signals, and a data bus 308b for transmitting 8-bit parallel control data and a parity bit signal.

The DMA control unit 303 suspends the use of the data bus 308b by the microprocessor 301 temporarily thereby to permit the other components to make direct access to a predetermined area in the data storage 302. The components engaged in DMA operation are connected to the DMA control unit 303 through the channels 310 to 314, so that a request signal or an acknowledge signal for DMA processing is communicated through these channels.

According to the present invention, each of the submodule control systems 320 and 330 includes an exclusive microprocessor. These sub-module control systems receive the task data from the basic module control system 303 through the communication line 321 and 331 respectively, and actuate their respective mechanisms in accordance with the task data under the control of the respective microprocessors.

Next, the main components of the basic module will be described below.

Microprocessor

Figure 13:
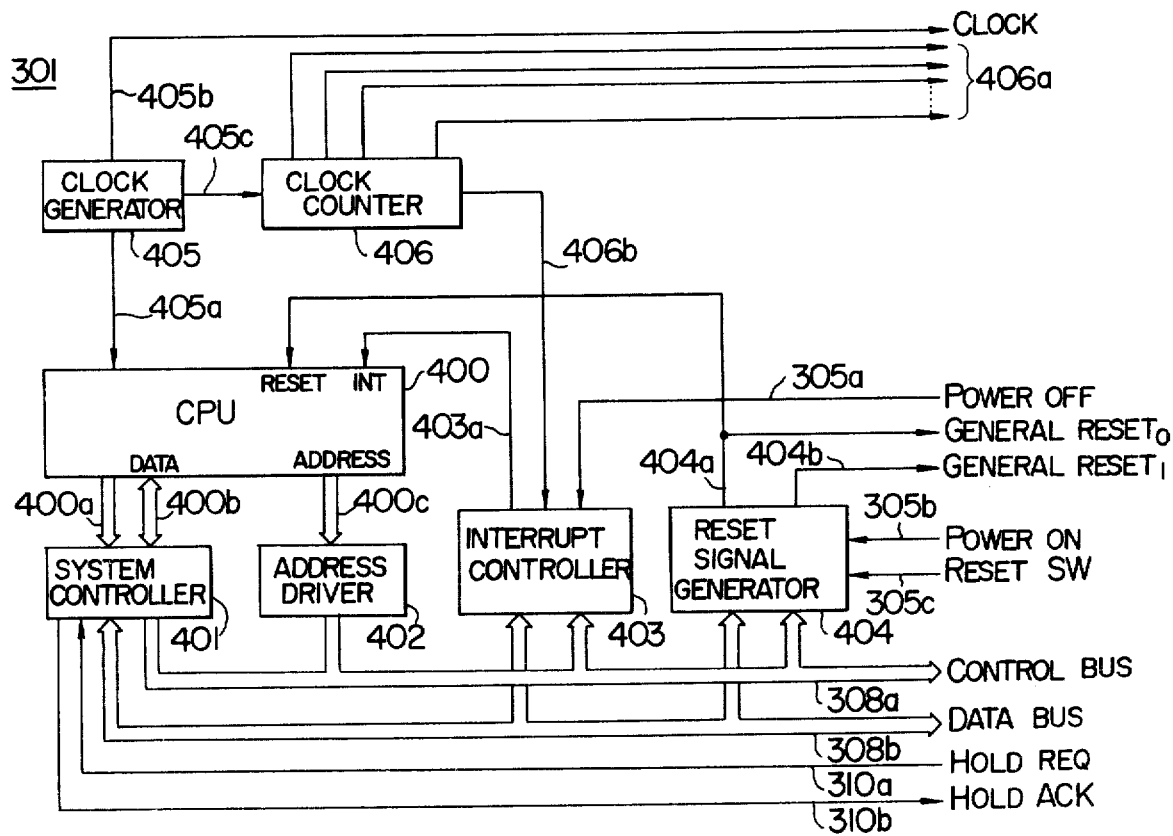
FIG. 13 is a block diagram showing the configuration of the microprocessor 301 shown in FIG. 12.

As shown in FIG. 13, the microprocessor 301 includes a central processing unit (CPU) 400 for processing 8-bit parallel data, a system controller 401 connected to the CPU 400 through internal data buses 400a and 400b, an address driver 402 connected to the CPU 400 through the internal address bus 400c, an interrupt controller 403, a reset signal generator circuit 404, and a clock pulse generator 405. The clock pulse generator 405 produces a clock pulse 405a for actuating the CPU 400, a clock pulse 405b for controlling the DMA operation, and a clock pulse 405c applied to the clock counter 406. The clock counter 406 counts the clock pulses 405 and produce various control clock pulses of different periods. The control clock pulses 406a include clock pulses for, for example, communication control, mechanism control and reading and writing data in the magnetic stripe, etc. The clock counter 406 applies a clock pulse 406b for timer interrupt control to the interrupt controller 403.

The system controller 401 latches and decodes the data status signal received from CPU 400 through the internal data bus 400a, and produces on the control bus 308a input-output signals including memory read (MEMR), memory write (MEMW), input/output device read (IOR) and input/output device write (IOW). The system controller 401 applies the data on the data bus 308b to CPU 400 through the internal bus 400b on the one hand and produces data bus 308b on the other hand. The system controller 401 is connected with the DMA control unit 303 via lines 310a and 310b and controls the CPU operation in response to the hold request signal from the DMA control unit. The address data produced from CPU 400 is applied to the control bus 308a through the inernal data bus 400c and address drive 402. As long as the DMA operation is performed, the address driver 402 operates in a manner to isolate the internal data bus 400c from the control bus 308a.

The interrupt controller 403 generates an interruption signal 403a and causes CPU 400 to perform an interrupting operation, in response to the timer interruption clock pulse 406b or the power-off signal 305a generated at the time of source voltage drop.

The reset signal generator circuit 404 generates two types of reset signals in response to a power switch-on signal 305b and a reset switch-on signal 305c from the control panel. The reset signal GENERAL RESET 0 produced on line 404a is a signal of predetermined pulse width and is automatically cut off after the lapse of a predetermined length of time, which signal is applied to reset terminals of LSI circuits of CPU 400, DMA controller 303 and module interface 304. The reset signal GENERAL RESET 1 produced on line 404b, on the other hand, is for resetting the mechanical units, and turned on and off in response to a command issued by the CPU 400 executing a program.

According to the present invention, the microprocessor 301 included in the basic module executes the program (already shown in FIG. 7) stored in the data storage 302, and produces address data on control bus 308a and control command data on data bus 308b in accordance with the program.

Each of the components connected to the control bus 308a is assigned with an 8-bit or 16-bit address code for distinguishing them from each other. The bits of lower orders of the address code specify individual mechanisms. The components connected to the control bus 308a, therefore, perform operations associated with the control command data on the data bus 308b when the data produced on the control bus 380a include the address data assigned to them respectively.

The basic module terminal control unit 307 actuates each mechanism in response to the control command data from the microprocessor, and produces on the data bus 308b the data representing the status of each mechanism. The microprocessor 301 reads these status data and proceeds with program sequence in accordance with the nature of the data.

Control panel control unit

Figure 14:
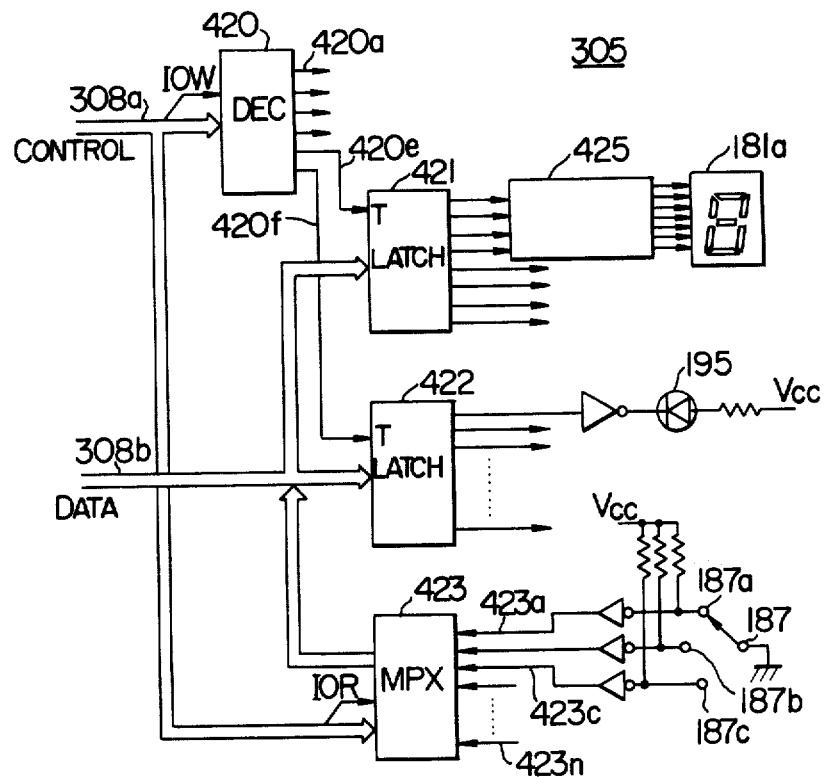
FIG. 14 is a block diagram showing a configuration of the control panel unit 305 included in FIG. 13.

The control panel, as explained with reference to FIG. 6, comprises: various output elements including a 7-segment indicator 181 for indicating the operating status code of the transaction equipment, an indicator 180 for indicating the transaction sequece step code and a plurality of indication lamps; and various input elements including a power source switch 182 and an operating mode change-over switch 187. As shown in FIG. 14, the unit 305 for controlling the control panel includes a decoder circuit 420 for decoding the address data on the control bus 308a and producing pulse signals 420a to 420f for latch instruction, latch circuits 421 and 422 for latching the control data on the data bus 308b in response to these pulse signals, a multiplexer 423 for producing the input signal 423a to 423n selectively on the data bus 308b in response to a specific address data on the control bus 308a.

The latch circuit 421 is for latching an 8-bit data representing a two-digit decimal number, from the data bus 308b, by being triggered by the pulse signal 420e. Among the data latched, four bits are applied to the decoder driver circuit 425 so that one numerical character is indicated on the 7-segment numeral indicator 181a. The remaining 4-bit data latched causes another numerical character still to be indicated on the other numerical indicator.

The latch circuit 422 is triggered by the pulse signal 420f, and latches the data for turning on a plurality of lamps on the control panel, from the data bus 308b. Each bit of the data latched corresponds to each of the lamps 195.

The multiplexer 423 is impressed with the signals 423a to 423n from the contacts of the switches on the control panel. The signals 423a to 423c, for instance, indicate the potentials at contacts 187a to 187c of ON LINE, TEST and OFF LINE respectively of the switch 187. The multiplexer 423 is for producing every eight bits of these input signals selectively on the control bus 308b in response to the address data on control bus 308a.

Basic module terminal control unit

Figure 15:
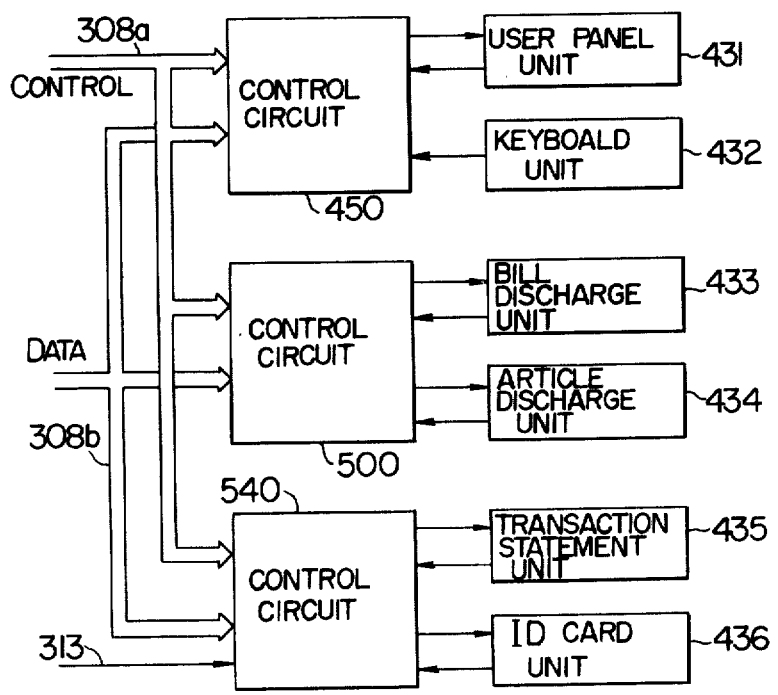
FIG. 15 is a block diagram showing a configuration of the basic module terminal control unit 307 shown in FIG. 13.

The basic module terminal control unit 307, as shown in FIG. 15, includes a first control circuit 450 for controlling the operation of the user panel unit 431 and the reading of the input data from the keyboard 432; a second control circuit 500 for controlling the cash issue unit 433 and the article discharge unit 434; and a third control circuit 540 for controlling the transaction statement unit 435 and the ID card unit 436.

The control circuits 450, 500 and 540 are connected to the control bus 308a and data bus 308b, apply an operating signal to the mechanical units 431 to 436 in response to the control data, and produce status data for the mechanical units onto the data bus 308b in response to an I/O read signal. The third control circuit 540 is also connected to the DMA control unit 303 through line 313.

Figure 16:
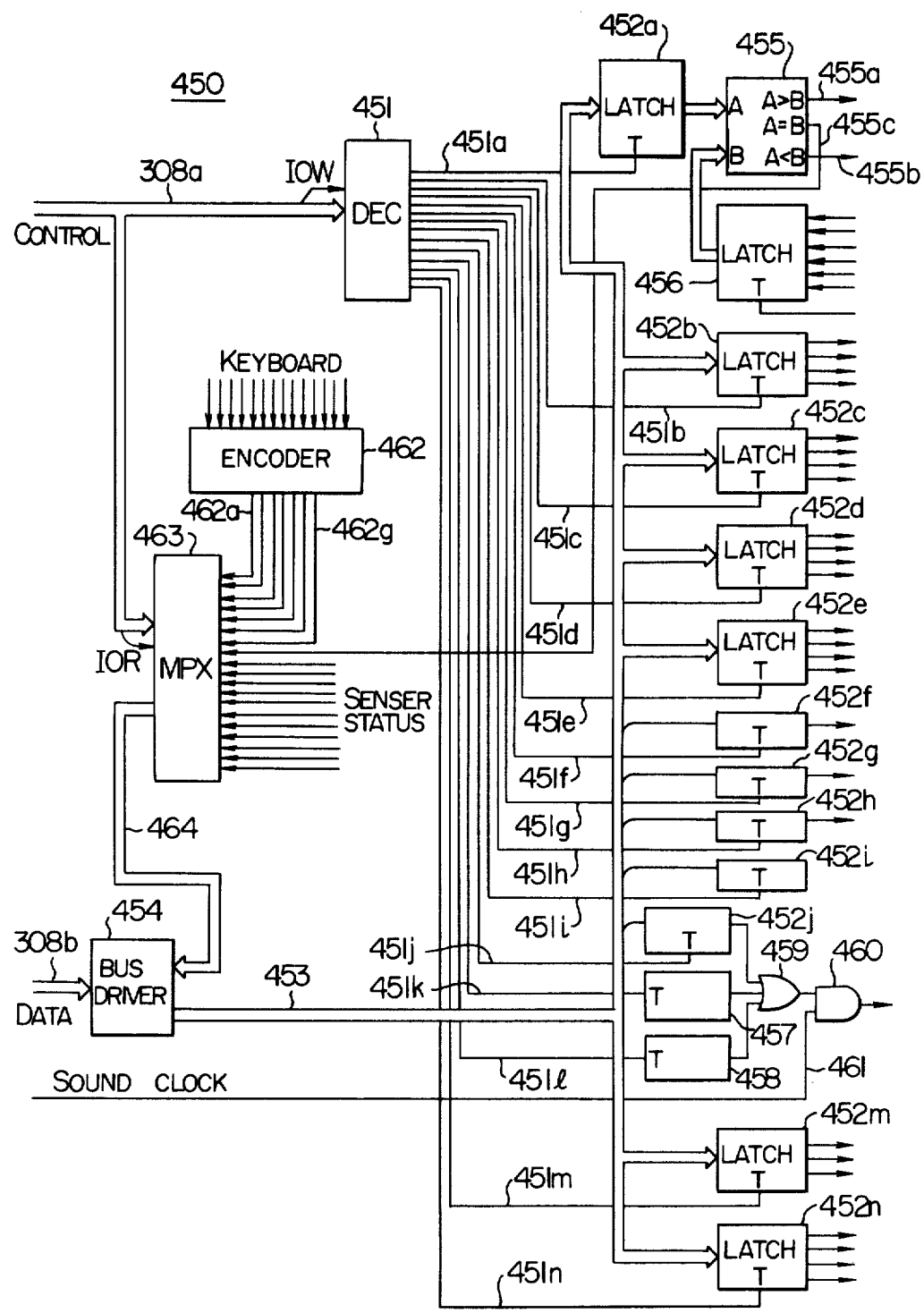
FIG. 16 is a block diagram showing a configuration of the control circuit for controlling the user panel unit and the keyboard unit shown in FIG. 15.

A specific circuit configuration of the first control circuit 450 is shown in FIG. 16.

In the case where the address data on the control bus 308a includes address data corresponding to the first control circuit 450, pulse signals 451a to 451n are produced from the decoder 451. These pulse signals, excepting the signals 451k and 451l applied to one-shot multivibrators 457 and 458 respectively, are applied as latch command signals to the latch circuit 452a to 452n, so that the latch circuits latch data of all or specified one of the 8-bit data on the internal data bus 453 connected to the data bus 308b through the bus driver circuit 454.

The latch circuit 452a latches a stop position designating data for the guidance screen 41 (FIG. 3), which data is applied as input data A to a decision circuit 455 for controlling the screen-driving motor 44. Data from the guidance screen position detector 45 is applied in the form of input data B to the decision circuit 455 through the latch circuit 456. The decision circuit 455 compares to data A and B with each other. When A is larger than B, it produces a control signal 455a for rotating the motor 44 in the forward direction; when A is smaller than B, it produces a control signal 455b for rotating the motor 44 in the reverse direction; and when A is equal to B, it produces a signal 455c indicating the completion of the positoning of the screen.

The latch circuit 452b latches data designating the operating condition of the transaction equipment and produces a solenoid control signal for swtiching the indications on the indicator 12 (FIG. 1).

The latch circuits 452c to 452e latch data representing the numeral characters of each digit of the amount, and the output signals of these latch circuits are applied to the decoder circuit of the 7-segment numerical character indicator included in the amount indicator 17.

The latch circuits 452f, 452g and 452h produce signals for controlling the solenoid 82 for actuating the shutter 20 of the discharge slot, the solenoid 55 for operating the ID card insertion slot shutter 51, and the solenoid 152 for operating the passbook insertion slot shutter 150. The latch circuit 452i is provided as a spare.

Output signals from the latch circuit 452j, the one-shot multivibrator 457 for generating a comparatively wide pulse, and the one-shot multi-vibrator 458 for generating a comparatively narrow pulse are applied to one of the input terminals of a two-input AND gate 460 through an OR gate 459, while the other input terminal of the AND gate 460 is impressed with a pulse signal 461 of a specific audible frequency, with the result that three types of audio signals of different durations to assist the user in the operation are supplied to the speaker 49.

The latch circuit 452m produces a signal for turning on the three guide lamps 18, 21 and 26 on the front panel 11 of the transaction equipment.

Further, the latch circuit 452n produces a signal for turning on the lamp for indicating the unit of amount (for example, yen) and the lamp for indicating the number of digits of the amount (for example, 10 thousands or 10 hundreds) included in the amount indicator 17.

Reference numeral 462 denotes an encoder circuit which is impressed with a signal generated from the keyboard 15 on the control panel and produces a specific pattern signals 462a to 462g corresponding to the keys depressed by the user. A signal produced from the encoder circuit 462 is applied to the multiplexer 463. Besides, the multiplexer 463 is impressed with the screen positioning end signal 455c, and signals representing the conditions of the sensors including the indication substance detector of the indicator 12, the magnetic card insertion detector 52, the magnetic card magnetism detector 53, the deposit bill insertion slot shutter detector 115, etc. These condition signals are produced onto the data bus 464 by 8-bit groups in response to address data and IOR signal on the control bus 308a. The status data on the data bus 464 is applied to the data bus 308b through the bus driver circuit 454 and read by the basic module microprocessor 301.

Figure 17:
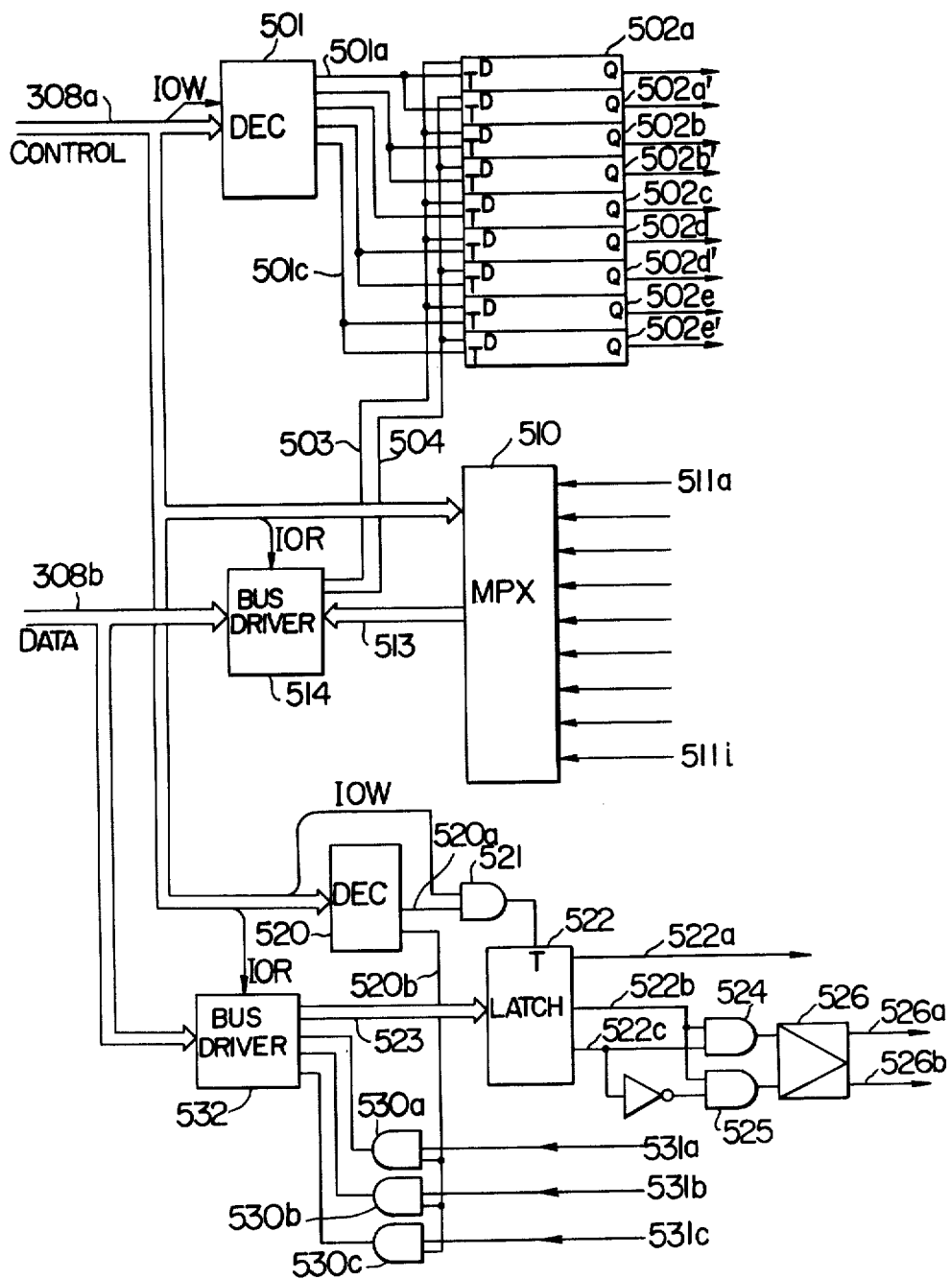
FIG. 17 is a block diagram showing a configuration of the control circuit 500 for controlling the cash issue unit and discharge unit shown in FIG. 15.

A specific circuit configuration of the second control circuit 500 for controlling the cash issue unit and the article discharge unit is shown in FIG. 17.

The decoder 501 is for selectively latching the control data relating to the cash issue unit, and produces latch command pulse signals 501a to 501e in accordance with the address data on the control bus 308a. These latch command pulse signals are applied to the latch circuits 502a to 502e' so that the latch circuits latch the 1-bit data on the data line 503 or 504 in response to the above-mentioned pulse signals. Data of specific bit among the 8-bit control data on the data bus 308b is produced onto the data lines 503 and 504. The latch circuits 502a to 502e' produce a driving signal for the vacuum pump (FIG. 3), an output change-over valve control signal for the vacuum pump 93, a driving signal for the motor 94, a turning-on control signal for the bill detectors 98a and 98b, a driving clutch control signal for the 10,000-yen bill recovery sucker 92a, a brake control signal for the sucker 92a, a driving clutch control signal for the 1,000-yen bill recovery sucker 92b, a brake control signal for the sucker 92b, and a control signal for the bill receiving gate 100, respectively.

The multiplexer 510 receives status signals 511a to 511i from the various sensors, which signals are applied to the internal data bus 513 in accordance with the address data on control bus 308a, and further through the bus driver circuit 514, to the data bus 308b. The status signals 511a to 511i include output signals from the cassette position detector, the remaining-number-of-bills detector, the sucker stop position detector, the passage detector and the overlapped bills detector for the 10,000-yen and 1,000-yen bills respectively.

The decoder circuit 520 is for selectively latching the control data relating to the article discharge unit, and produces pulse signals 520a and 520b in accordance with the substance of the address data on the control bus 308a. The pulse signal 520a is applied, together with the IOW signal on the control bus 308a, to the AND gate 521, so that the output signal of the AND gate 521 triggers the latch circu 522. In response to the latch command pulse, the latch circuit 522 latches the conrol data from the internal data bus 523 on which the 8-bit data on the data bus 308b is produced via the bus driver circuit 532, and produces the control signals 522a and 522b in accordance with the latched data. The control signal 522a controls the solenoid for operating the article holding plate 81, while the control signal 522b is for issuing a command for turning on or off the discharge transport passage driving motor 78, and is applied to the first terminals of AND gates 524 and 525. The second terminal of the AND gate 524 is impressed with the control signal 522c indicating the direction of motor rotation, while the second terminal of the AND gate 525 is supplied with a reversed signal of the control signal 522c. The outputs of these two AND gates are applied to the motor driver circuit 526, thus producing the control signal 526a for forward rotation of the motor 78 and the control signal 526b for reverse rotation of the same.

Another pulse signal 520b produced from the decoder circuit 520 is applied to the first terminals of the three AND gates 520a to 530c, thus controlling the application to the bus driver circuit 532 of the signal 531a applied to the second input terminals of the AND gates from the discharge slot detector 84, the signal 531b applied from the fork position detector 79, and the signal 531c from the detector for the holding plate 81, respectively. The output signals produced from the detectors and received by the bus driver circuit are produced and read by the basic module microprocessor 301 in response to the IOR signal on the control bus 308a.

Figure 18:
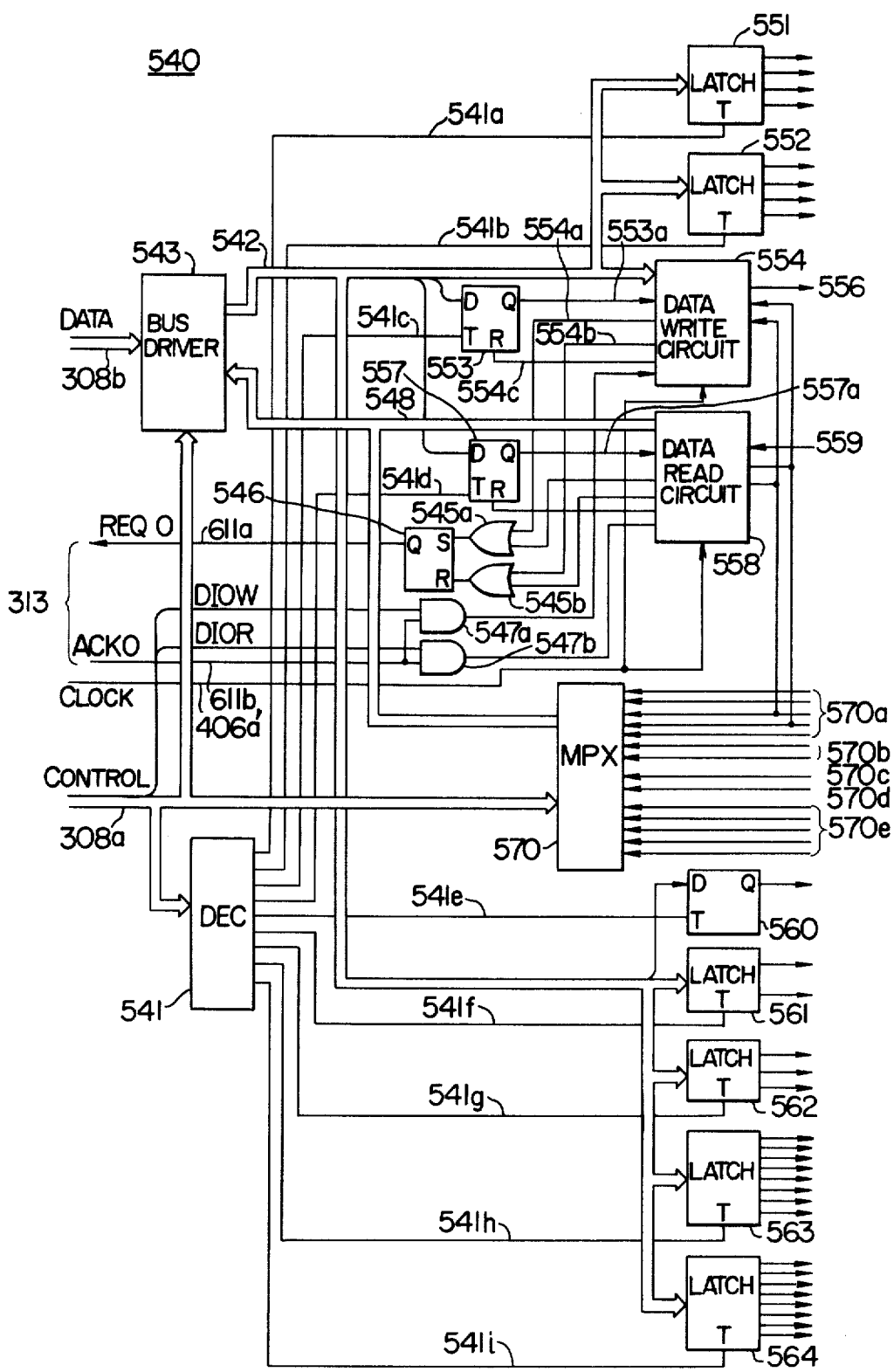
FIG. 18 is a block diagram showing a configuration of the control circuit 540 for controlling the transaction statement unit and the ID card unit included in FIG. 15.

A circuit configuration of the third control circuit 540 for controlling the transaction statement unit and the ID card unit is shown in FIG. 18.

The decoder circuit 541 is for decoding the address data on the control bus 308a and producing a plurality of pulse signals 541a to 541i for latch command.

The latch circuit 551 is triggered by the pulse signal 541a; latches the control data from the internal control data bus 542, which is connected to the data bus 308b through the bus driver circuit 543; and produces a driving signal for energizing the solenoid 55 for actuating the ID card insertion shutter 54, the solenoid for actuating the imprint roller, and like.

The latch circuit 552 is triggered by the pulse signal 541, latches the data from the internal data bus 542, and produces a signal for controlling the motor 53 for ID card transport.

The latch circuit 553, which is triggered by the pulse signal 541c, latches the data and produces a signal 553a for rendering the data write circuit 554 ready for operation. The data wire circuit 554 is for writing the magnetic recorded data in the magnetic stripe of the ID card, and in operation, applies the data read from the data storage 302 and subjected to frequency modulation to the magnetic head 61 (FIG. 3). The data write circuit 554 produces signal 554a in response to the command data from the data bus 542 upon receipt of the signal 553a. When the signal 554a sets the flip-flop 546 through the OR gate 545a, a signal REQO requesting data transmission is applied from the flip-flop 546 to the DMA control unit 303. As will be described specifically later, the DMA control unit 303, in response to the signal REQO, produces the DMA aknowledge signal ACKO on the signal line 611b, and then produces the DMA data write signal (DIOW) on the control bus 308a, and the data to be transmitted, on the control bus 308b. The DMA control unit 303, in response to the DMA request for data, produces the DMA data read signal (DIOR) in place of the signal DIOW. The signals DIOW and DIOR are applied to the AND gates 547a and 547b adapted to be opened by the signal ACKO.

The magnetic data write circuit 554, in response to the output signal of the AND gate 547a, latches the data from the internal data bus 542, and then produces signal 554b. This signal is applied through the OR gate 545b to the reset terminal of the flip-flop 546, with the result that the DMA request signal REQO is stopped. The data write circuit 554 modulates the latched data by the clock pulse 406a, and produces a magnetic stripe write signal 556. Upon completion of writing of 1-byte data on the magnetic stripe, a signal for DMA request is produced again. By repeating this process, prodetermined data is recorded in the magnetic stripe. By the way, the data write circuit 554 performs the data write operation in a predetermined section of the magnetic stripe which is recognized by the signal 570a from the ID card position detector; and upon completion of the data writing operation in the particular section, produces signal 554c, resets the latch circuit 553 and stops operation.

The latch circuit 557, which is triggered by the pulse signal 541d, latches 1-bit data from the internal data bus 542 and produces signal 557a to render the data read circuit 558 ready for operation. The data read circuit 558 converts the signal 559 received from the magnetic head 61 for scanning the magnetic stripe of the ID card, into an 8-bit parallel data and produces it on the internal data bus 548. This data DMA is transferred to the predetermined area in the data storage 302 through the bus driver circuit 543 and the data bus 308a.

When the 8-bit to be applied to the data bus is prepared, the data read circuit 558 applies a signal for setting the flip-flop 546, and makes DMA request for data receipt. In response to this DMA request, the DACK and DIOR signals are applied to the AND gate 547b from the DMA control unit. The magnetic data read circuit 558, in response to the output signal of the AND gate 547b, produces an 8-bit on the internal data bus 548 on one hand and applies a reset signal to the flip-flop 546 through the OR gate 545b on the other hand, thus terminating the DMA request.

Like the data write circuit 554, the data read circuit 558 identifies the magnetic data read section of the magnetic stripe in response to the signal 570a from the ID card position detector; and produces a signal for resetting the latch circuit 557, thus ending the reading operation, when the magnetic head has passed the particular section.

The latch circuit 560 triggered by the pulse signal 541e produces a signal for controlling the solenoid to feed the journal form at a predetermined rate.

The latch circuit 561 triggered by the pulse signal 541f produces a statement form cutter driving signal and a stamp driving signal.

The three latch circuits 562 to 564 triggered by the pulse signals 541g to 541i produce signals for driving the hammer of the statement printer.

The multiplexer 570 is impressed with the status signals 570a from the ID card detectors 62a to 62e located in the ID card read/write section, the status signal 570b from the ID card detector in the transaction statement unit, the status signal 570c, from the remaining journal-form volume detector, the status signal 570d from the statement detector in the transaction unit, and the status signal 570e from the printing drum position detector. The multiplexer 570 applies these signals selectively to the internal bus 548 in accordance with the substance of the control bus 308. The status data produced onto the internal bus 548 are applied through the bus driver circuit 543 to the data bus 308b and read by the microprocessor 301.

DMA control unit and module interface

Figure 19:
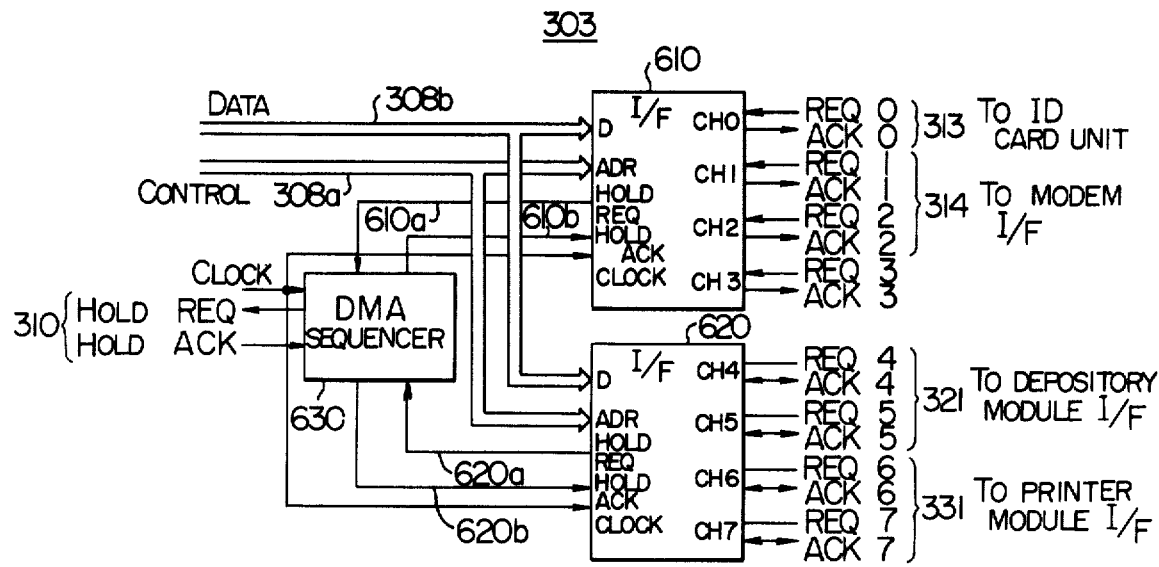
FIG. 19 is a block diagram showing a configuration of the DMA control unit 303 included in FIG. 12.

As shown in FIG. 19, the DMA control unit comprises the DMA controller 610 for processing the DMA request from the components connected to the channels CH0 to CH3, the DMA controller for processing the DMA request from the components connected to the channels CH4 to CH7, and the DMA sequencer 630 for selectively processing the data bus hold request and the aknowledgement signals from the above-mentioned two DMA controllers.

The first channel CH0 of the DMA controller 610 is connected to the ID card unit control circuit 540, while the second and third channels CH1 and CH2 are connected to the MODEM interface 306.

Further, the first channel CH4 and the second channel CH5 of the DMA controller 620 are connected to the depository module interface 640; and the third channel CH6 and the fourth channel CH7 to the printer module interface 650.

The operation of the DMA unit will be explained below with reference to the data transfer made by the channel CH0 with the ID card unit control circuit and also to FIG. 18.

The microprocessor 301, in attempting to transmit data of a plurality of bytes to the data write circuit 554, first stores the data to be transferred, in a predetermined area in the data storage 302, and sets the initial address of the particular area and the number of bytes to be transferred, in the controller 610 through the data bus 308b. Then, the microprocessor 301 issues a data write start command to the ID card unit control circuit through the control bus 308a. This command causes the latch circuit 553 ready for actuating the magnetic data write circuit 554, and the circuit 544 sets the flip-flop 546, thus producing the DMA request signal REQ0.

DMA controller 610, upon receipt of the signal REQ0 through the channel CH0, produces the data bus hold request signal 610a. This hold request signal is applied to the microprocessor 301 through the control line 310 by the DMA sequencer 630. The microprocessor 301, upon receipt of the hold request signal, puts the control bus 308a and data bus 308b into the floating state on the one hand and produces the hold acknowledgement signal onto the control line 310 on the other hand. When this signal is applied to DMA controller 610 through the DMA sequencer 630, the DMA controller 610 produces the DMA acknowledgement signal ACK0 onto the channel CH0 and reads out the data onto the data bus 308b from the address in the data storage designated beforehand. After that, the address set in the controller 610 is counted up by one, while the data byte is counted down by one. The ID card unit control circuit 540, upon receipt of the signal ACK0 from the channel CH0, resets the flip-flop CH0 and cuts off the DMA request signal REQ0.

The DMA controller 610, in response to the cutting-off of the DMA request signal on the channel CH0, cuts off the data bus hold request signal. As a result, the microprocessor 301 releases the processing wait state, restores bus line to a coupled state, and resumes the data processing. As soon as the preparation for data writing operation is completed, the ID card unit control circuit 540 produces the next DMA request, and the above-mentioned process of operation is repeated until the data with the bytes in the designated number have been completely read.

In the case where data is transferred from the magnetic data read circuit 558 to the data storage, in contrast, the microprocessor 301 informs the DMA controller 610 of the number of data bytes and the address in the data storage where the data is to be stored, and after that, issues the data read start command to the ID card control unit 540. As soon as the data read is prepared, the control circuit 540 produces the DMA request signal REQ0. By following operating steps similar to those for the above-mentioned data write, the DMA controller 610 writes the data on the data bus in the predetermined area in the data storage.

Figure 20:
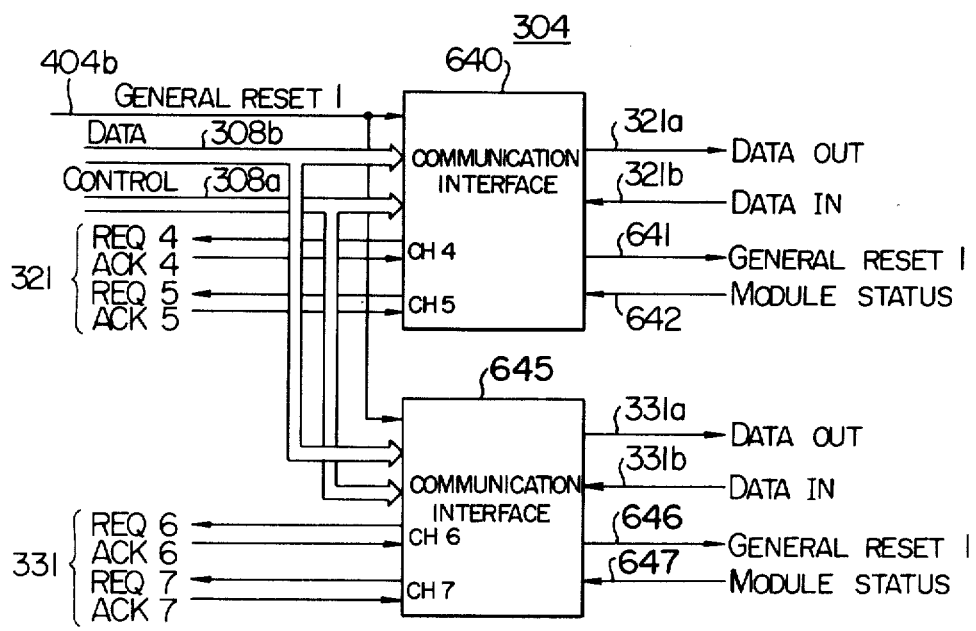
FIG. 20 is a block diagram showing a configuration of the module interface unit 304 included in FIG. 12.

The module interface unit 304 connected to the DMA controller 620 is shown in FIG. 20.

The module interface unit 304 comprises an interface circuit 640 connected to the channels CH4 and CH5 of the DMA controller 620 for communication with the depository module control system, and the interface circuit 650 connected to the channels CH6 and CH7 for communication with the printer module control system.

Each of the interface circuits 640 and 650 includes a decoder circuit for decoding the address data on the control bus 308a, and a serial-parallel data converter circuit. The serial-parallel data converter circuit is operated in response to the output pulse signal from the decoder circuit and the control signal applied from the control bus 308a, in such a manner that for transmitting the data to the sub-module, the 8-bit data on the data bus 308b is converted into serial data and produced on the signal line 321a or 331a; and for receiving the data from the sub-module, the serial data transmitted through the signal line 321b or 331b is converted into 8-bit parallel data and produced on the data bus 308b.

According to the present invention, transmission of data from the basic module control system 300 to the sub-module control system 320 or 330 and the transmission of status data from the sub-module control system to the basic module control system are effected through the communication interface circuits 640 and 650. In the basic module, the transfer of data between the interface circuits 640, 650 and the data storage 302 is effected by use of the DMA control unit 303. The interface circuit 640 is connected to the DMA controller 620 by two channels CH4 and CH5. The channel CH4 is used for DMA control in transmitting data to the depository module, and the channel CH5 for DMA control in receiving data from the depository module. The interface circuit 650, on the other hand, is connected to DMA controller 620 through the two channels CH6 and CH7. Channel CH6 is for DMA control in transmitting data to the printer module, and channel CH7 for DMA control in receiving data from the printer module.

The microprocessor 301, in attempting to transmit a certain task data to a sub-module, for example the depository module 320, stores the data to be transmitted in a predetermined area of the data storage 302, and sets the first address of the particular area and the number of bytes of the data to be transmitted, in the DMA controller 620. Then, the microprocessor 301 applies the command data signifying the starting of data transmission to the interface circuit 640. In response to the command data, the interface circuit 640 is actuated, and if possible to process the data to be transmitted to the depository module 320, produces the DMA request signal REQ4 on the channel CH4. The DMA controller 620, in response to the DMA request signal REQ4, performs a predetermined operation, reads 1-byte data from the data storage out onto the data bus 308b, and applies to the control bus 308a address data and control signals designating the interface circuit 640. The interface circuit 640, in response to the data on the control bus 308a, collects the 8-bit parallel data from the data bus 308b, converts it into a serial data, and produces it bit by bit on the signal line 321a.

When the serial data is received from signal line 321b, in contrast, the serial data is converted into an 8-bit parallel data by the interface circuit 640, so that the data produced on the data bus 308b is written in the designated address in the data storage.

The signal GENERAL RESET 1 produced from the microprocessor 301 is supplied by signal lines 641 and 651 to each sub-module control system through these interface circuits 640, 650. The module status signal indicating whether each sub-module is ready for operation is adapted to be produced at a predetermined bit of the data bus 308b through the interface circuits 640 and 650 by the signal lines 642 and 652.

Figure 21:
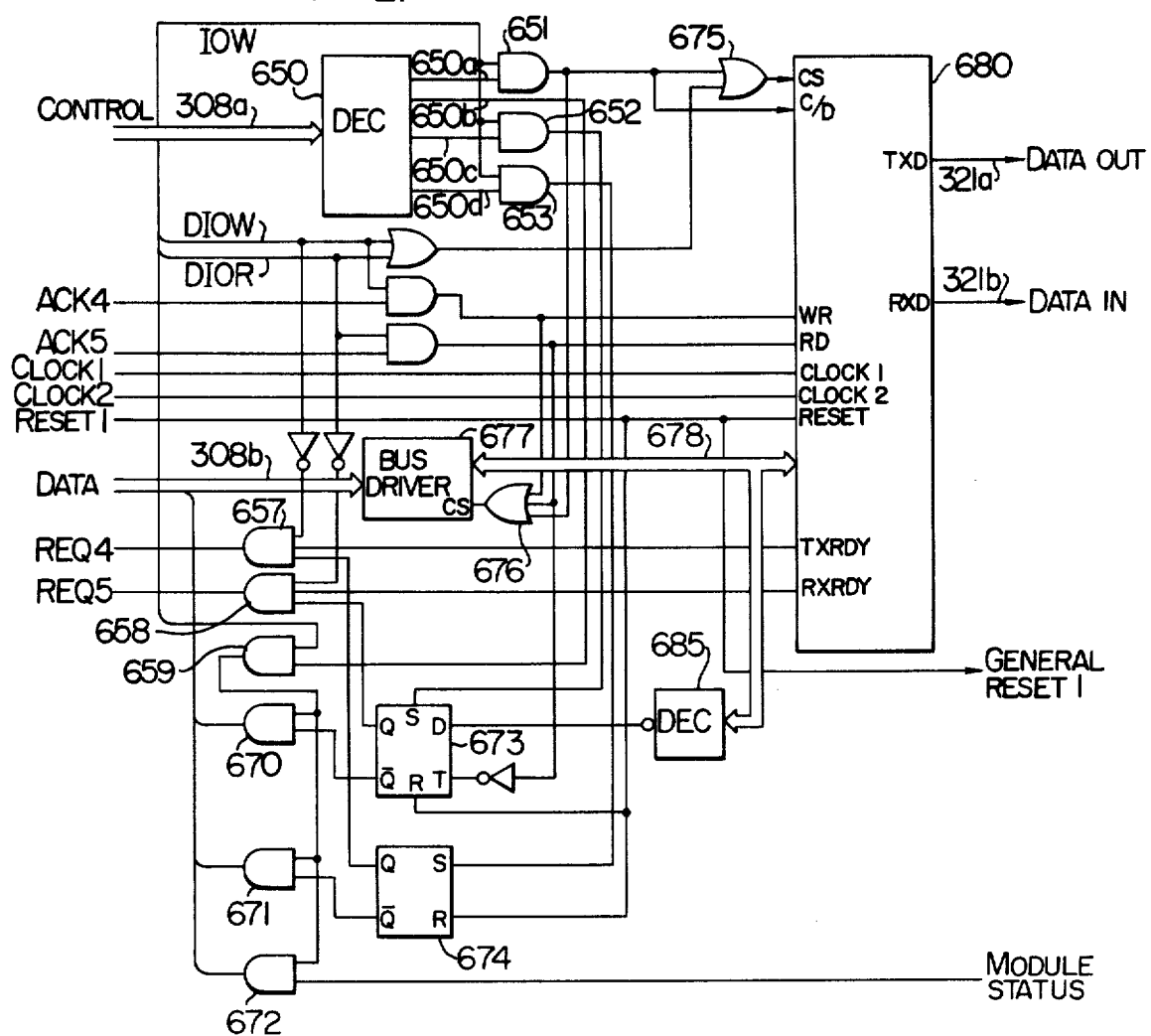
FIG. 21 is a block diagram showing a configuration of the communication interface 640 included in FIG. 20.

A more detailed circuit configuration of the interface circuit 640 is shown in FIG. 21. The decoder circuit 650 decodes address data on the control bus 308 and produces pulse signals 650a to 650d in accordance with the address data.

The pulse signal 650a is for status reading of the interface circuit, and is applied to the gate 659 opened by the control signal IOR. The output signal of the gate 659 opens the gates 670, 671 and 672. The status signal for the receiving enable flip-flop 673, the status signal for the transmission enable flip-flop 674, the status signal for the transmission enable flip-flop 674, and the module status signal are applied to the data bus 308a from the gate 670, gate 671 and gate 672, respectively.

The pulse signal 650b is applied to the gate 651 opened by the control signal IOW, and the output signal from the gate 651 is applied through the OR gate 657 to the serial-parallel data converter circuit 680 and made operable by the circuit 680. At the same time, the signal from the gate 651 is applied through the OR gate 676 to the bus driver 677, thereby connecting the data bus 308a and the internal bus 678. As a result, the converter circuit 680 collects data from the internal data bus 678.

The converter 680 produces an ON signal at the terminal TXRDY when the data to be transmitted next is settable, and produces an ON signal at terminal RXRDY when the received serial data is converted into parallel data and ready for transfer.

The pulse signal 650c from the decoder circuit is applied to the gate 652 opened by the control signal IOW. The output signal of the gate 652 is used to set the receiving enable flip-flop 673. The signal produced when the flip-flop 673 is set is applied to the AND gate 658 which is opened when the output at the terminal RXRDY is ON and the data read strobe signal DIOR from DMA unit is off. The same signal is produced from the AND gate 658 as a signal REQ requesting the DMA unit to transfer the data to the storage.

The pulse signal 650d from the decoder circuit 650 sets the transmission enable flip-flop 674 through the gate 653 opened by the control signal IOW. The output signal of this flip-flop is applied to the AND gate 657, takes the form of request signal REQ4 for requesting the DMA unit to transfer data from the storage when the output at terminal TXRDY is ON and the data write strobe signal DIOW from the DMA unit is OFF.

The decoder circuit 685 connected to the internal data bus 678 is for detecting the end of the received data, and the output thereof is turned OFF when all the bits of the 1-byte data supplied from the signal line 321b are "1". Since the output of the decoder circuit is applied to the flip-flop 673 in a predetermined timing, the request signal REQ5 may be turned OFF when the final byte of the received data is received.

Depository module control system

Figure 22:
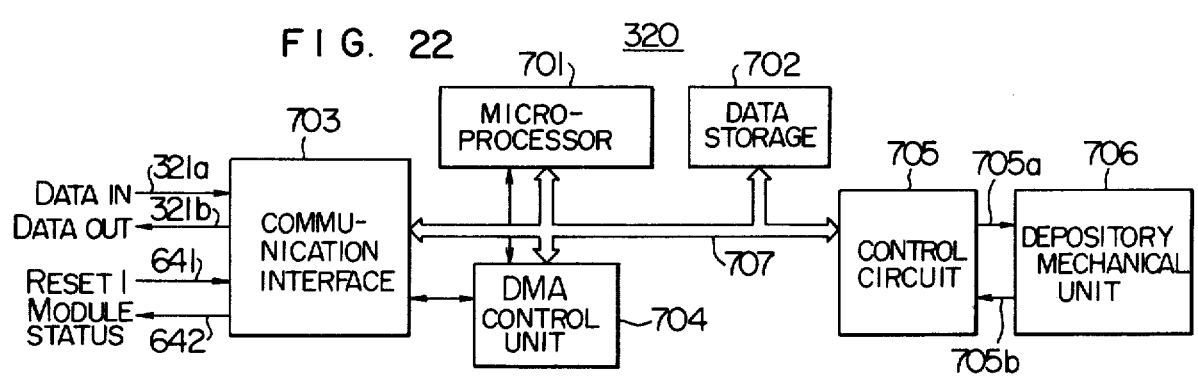
FIG. 22 is a block diagram showing a configuration of the depository module control system 320 included in FIG. 12.

The depository module control system 304 comprises, as shown in FIG. 22, the microprocessor 701, the data storage 702 including ROM for storing the program shown and RAM for data storage shown in FIG. 10, the communication interface unit 703 for communication of data with the interface unit 640 of the basic module, the DMA control unit 704 for controlling data transmission between the communication interface unit 703 and the data storage, the control circuit 705 for operating the depository terminal unit 706 in accordance with the control data and address data produced from the microprocessor 701, and the bus 707 for interconnecting these components 701 to 705. The bus 707 includes a data bus for transmitting the 8-bit parallel data and a control bus for transmitting address data and various control signals.

The microprocessor 701, communication interface 703 and the DMA control unit 704 are respectively used in a configuration similar to corresponding components included in the basic module control system 300.

The communication interface unit 703 is for converting the serial data transmitted from the basic module by way of signal line 321a, into 8-bit parallel data, and writes the data in a predetermined area of the data storage 702 in response to the operation of the DMA control unit. According to the present invention, the data transmitted thus from the basic module to the sub-module contains the data indicating the task to be accomplished by the sub-module.

The microprocessor 701 for processing the data according to the program stored in the data storage in the depository module decodes the task data transmitted from the basic module, and applies to the data bus 707b the command data in accordance with the task. This command data is applied to the terminal control circuit 705, so that the control circuit 705 produces on signal line 705a a control signal in accordance with the command (which signal line actually includes a plurality of signal lines) and thus controls the operation of the depository terminal unit 706. The status signals for the various detectors or sensors included in the depository terminal unit 706, on the other hand, are concentrated in the control circuit 705 by the signal line represented by reference numeral 705b. The control circuit 705 groups these status signals into 8-bit data and applies them selectively to the data bus 707b in accordance with the command from the microprocessor 701. The microprocessor 701 identifies the status data read from the data bus 707b and proceeds with the program sequence. Upon completion of a predetermined program sequence corresponding to the task data or upon occurrence of an abnormality in a terminal unit, the microprocessor 701 applies the data representing the result of processing, to the communication interface circuit 707 through the operation of the DMA control unit. The interface circuit 703 transmits this data to the basic module through channel 321b. The basic module control system, upon receipt of the result of processing of the task transmitted from the depository module, proceeds with the program sequence in accordance with the substance of the particular data, thereby effecting the processing for completion of the transaction or transmission of new task data to the sub-module. The depository module control system repeats the above-mentioned operations and applies control signals successively to the mechanism units in accordance with the new tasks.

Figure 23:
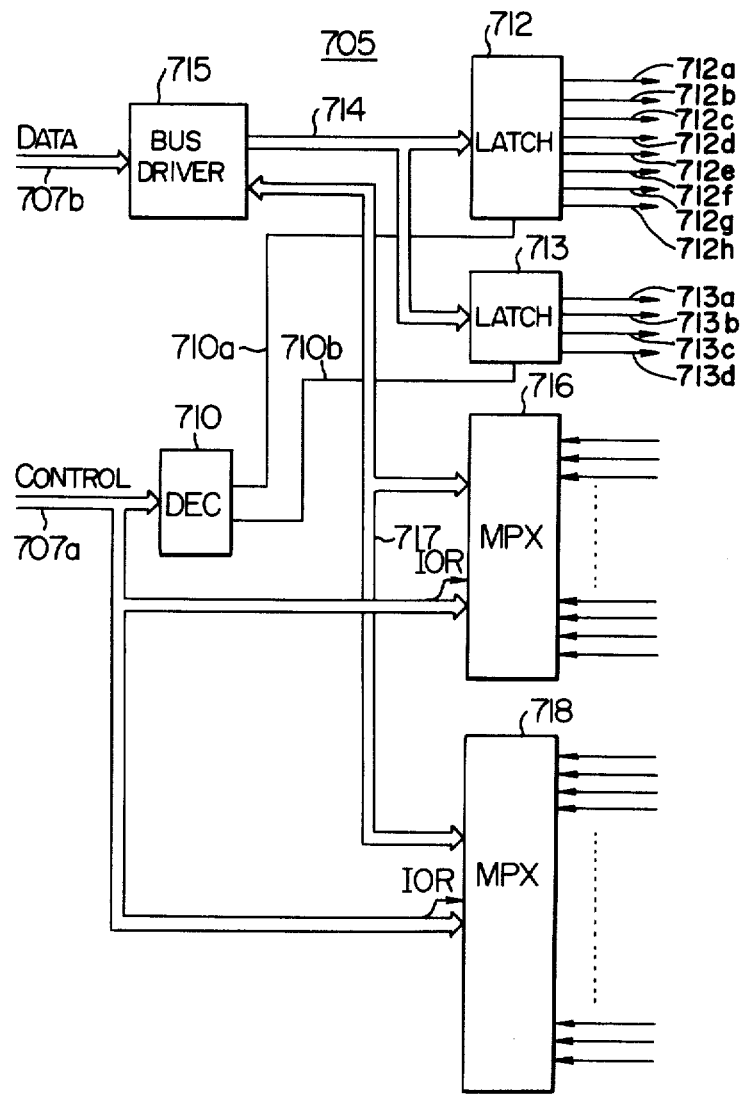
FIG. 23 is a block diagram showing a configuration of the control circuit 705 for controlling the depository terminal unit included in FIG. 22.

The control circuit 705 has a circuit configuration as shown in FIG. 23. The decoder circuit 710 decodes the address data on the control bus 707a and selectively produces according to the address data, the pulse signal 710a for triggering the latch circuit 712 and the pulse signal 710b for triggering the latch circuit 713. The circuit 712, in response to the pulse signal 710a, collects the command data from the internal data bus 714 (connected to the data bus 707b through the bus driver circuit 715), and produces control signals 712a to 712h corresponding to respective bits of the command data. As a result, signals are produced for turning on the phot-sensor placed in the bill transport passage, for energizing the solenoid 116 for unlocking the bill holding plate, for controlling the motor 112 for moving the bill holding plate, for controlling the transport motor 120, for controlling the forward motion of the transport motor 141, for controlling the reverse motion of the transport motor 141, for controlling the clutches for actuating the rollers 118a and 118b for collecting the bills from the hopper 111, and for controlling the reject gate 128.

In response to the command data collected from the internal data bus 714, the latch circuit 713 produces control signals 713a to 713d for controlling the motor 132 for returning the bills, the solenoid for actuating the shutter 138 placed temporarily in the stack position, the clutch 142 for actuating the roller 139 for transporting the bills into the safe, and like.

This control circuit has two multiplexers 716 and 718 for processing the status signals for the depository unit.

The multiplexer 716 is impressed with status signals from the detector 111b for detecting the bills in the hopper, the bill insertion slot cover detector 115, the detector 140 for detecting the bills in temporary stack position, the detector 131 for detecting the bills on the return tray, detectors 147 and 148 in the position of the safe, and several bill passage detectors located in the course of the bill transport passages, and applies these status signals selectively by groups of 8 bits to the internal data bus 717 in accordance with the address data on the control bus 707. The data on the internal data bus 717 is applied through the bus driver circuit 715 to the data bus 707b.

The other multiplexer 718 is impressed with status signals from the detector for detecting bill position, a bill size detector, bill printing pattern detector, bill magnetic ink distribution detector and like included in the bill verifier 123. The multiplexer 718 also applies selectively these status signals by groups of 8 bits to the internal data bus 717 in accordance with the address data on the control data bus 707a.

Printer module control system

Figure 24:
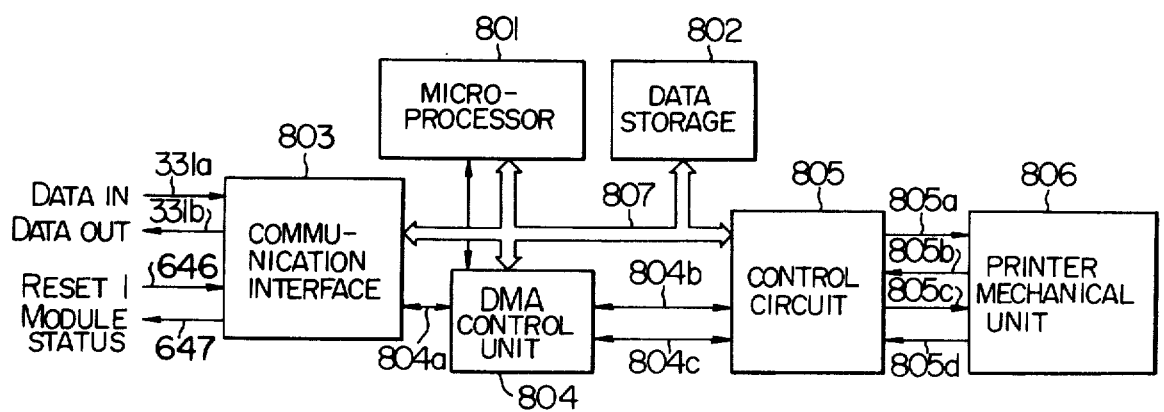
FIG. 24 is a block diagram showing a configuration of the passbook printer module control system 330 included in FIG. 12.

The printer module control system 330 comprises, as shown in FIG. 24, the microprocessor 801, the data storage 802, the communication interface unit 803 for data communication with the communication interface unit 640 of the basic module, the DMA control unit 804 for controlling the data transfer between the interface unit 803 and the data storage 802, the control circuit 805 for actuating the printer terminal unit 806 in accordance with the control data and address data produced from the microprocessor 701, and the bus 807 including the data bus 807a and control bus 807b for interconnecting the components 801 to 805.

The data storage 802 keeps in store the program shown in FIG. 11. The task data received by the communication interface unit 803 from the basic module is set in the data storage 802 in the process similar to that followed in the depository module. The microprocessor 801 executes the program in accordance with the task data and applies the command data and address data onto the bus 807. The control circuit 805, in accordance with the data on the bus 807, produces the printer terminal control signal 805a, or selectively produces the printer terminal status signal 805b onto the bus 807. The control circuit 805 further controls the output of the printer dot driving signal 805c and the input of the magnetic record data 805d read from the magnetic stripe on the passbook.

The DMA control unit 804 is connected via the control channel 804a to the communication interface unit 803, whereby the transfer of data in the communication interface unit 803 is processed. The DMA control unit 804 is further connected to the control circuit 805 through the control channels 804b and 804c, thus controlling the transfer of the dot driving signal 805c and the magnetic record data 805d.

Figure 25:
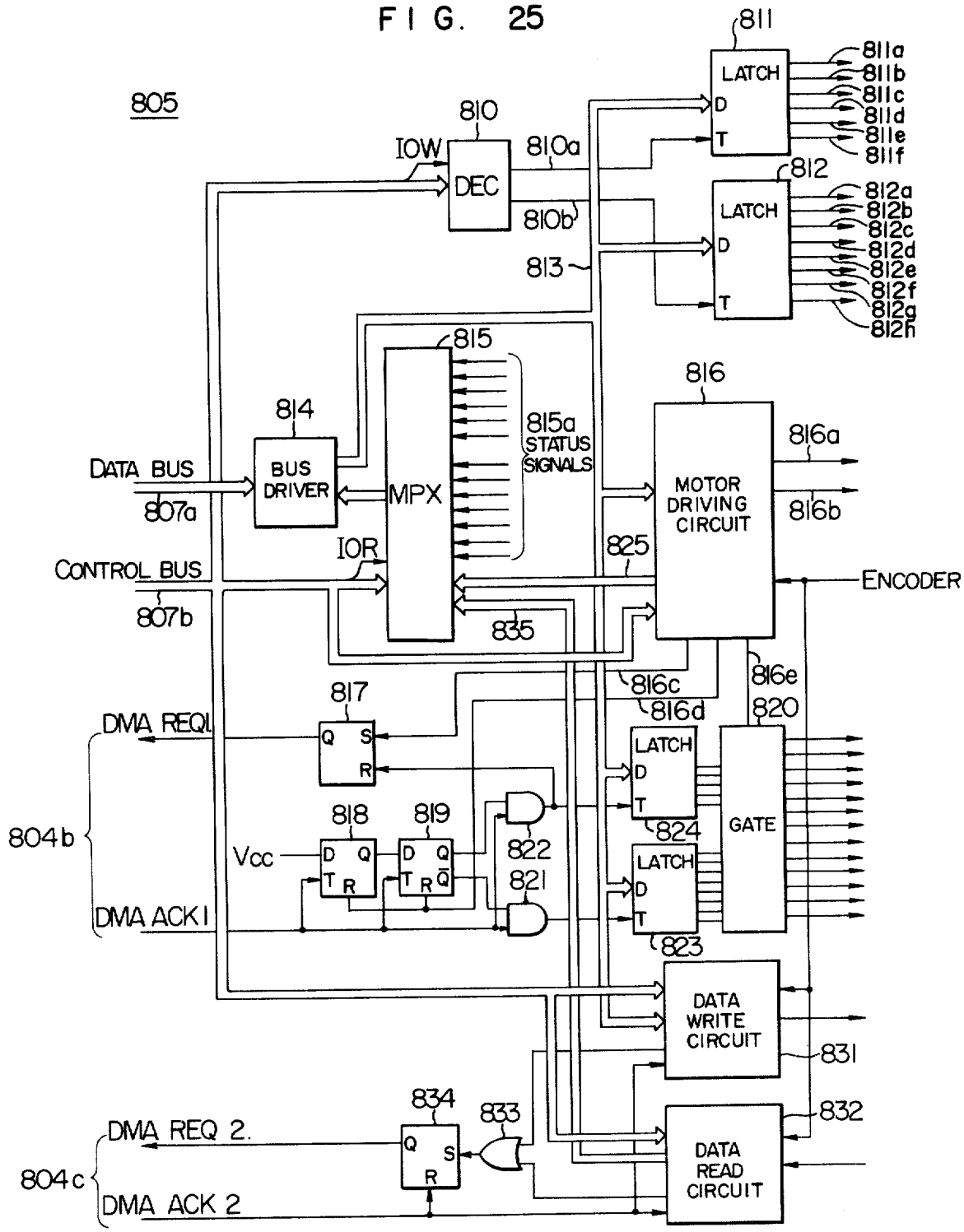
FIG. 25 is a block diagram showing a configuration of the control circuit 805 for controlling the printer terminal unit included in FIG. 24.

A circuit configuration of the control circuit 805 is shown in FIG. 25. The decoder circuit 810 produces the pulse signal 810a for triggering the latch circuit 811 and the pulse signal 810b for triggering the latch circuit 812 in accordance with the address data on the control bus 807a. The latch circuit 811, when triggered, latches the data on the internal data bus 813 (which is connected with the data bus 807a through the bus driver circuit 814), and in accordance with the substance of the data, produces the ink ribbon check command signal, the sensor lamp ON signal, the printer brake driving signal, the printer clutch driving signal, the passbook transport clutch driving signal, and the passbook magnetic stripe reader clutch driving signal. The latch circuit 812, on the other hand, produces, in accordance with the substance of the latched data, signals 812a-812h, the signal for driving the pressure roller 154, the driving signal for pressure roller 160, the driving signal for stop finger 155, the driving signal for stop finger 161, the solenoid driving signal for actuating the platen 165, the ink ribbon change-over signal, the driving signal for the solenoid 158 for actuating the movable guide, and like.

The multiplexer 815 connected to the bus driver circuit 814 is impressed with the status signals 815a from the switches and sensors or detectors placed at various points in the printer mechanism unit and the status data from the internal data buses 825 and 835 described later, and in accordance with the address data on the control bus 307b, selectively applies these status signals by groups of 8 bits onto the data bus 807a.

The motor driving circuit designated by numeral 816, in response to the predetermined address data produced on the control bus 807b, collects the data from the internal data bus 813, and produces the control signals 816a and 816b for forward or reverse rotation of the servo-motor 169. The motor driving circuit 816 further produces the signal 816c for setting the flip-flop 817 for producing the DMA request signal (REQ1) for receiving the printer dot drive data, the signal 816d for resetting the two flip-flops 818 and 819 for deciding that the transmitted dot drive data is the first or second byte, and the timing signal 816e for opening the gate circuit 820 producing the received dot drive data. The printing of one character requires dot drive data of two bytes.

When the motor driving circuit 816 produces signal 816c, the DMA signal REQ1 is produced to the DMA control unit 804 through the channel 804b, in response to which the first DMA acknowledge signal ACK1 is transmitted from the DMA control unit.

If the signal ACK1 is applied with both flip-flops 818 and 819 reset, the flip-flop 818 remains set and the flip-flop 819 remains reset. Therefore, the signal ACK1 triggers the latch circuit 823 through the gate 821 opened by the Q output of the flip-flop 819, so that the dot drive data of the first byte transmitted via the data bus 807a is latched in the latch circuit 823. Upon subsequent application of the second signal ACK1, the fact that the Q output of the flip-flop 818 is already turned ON causes the flip-flop 819 to be set. As a result, the signal ACK1 triggers the latch circuit 824 through the gate 822 opened in response to the Q output of the flip-flop 819, so that the dot drive data of the second byte is latched by the latch circuit 824. At the same time, the flip-flop 817 is reset by the output signal of the gate 822 and the DMA request signal REQ1 disappears.

During the rotation of the motor, the signal from the encoder mounted on the rotary shaft of the motor is applied to the motor driving circuit 816 so that the data indicating the rotational position of the motor is applied to the multiplexer 815 via the internal data bus 825 and adapted to be read by the microprocessor 801. On the basis of this data, the microprocessor 801 monitors the distance covered by the passbook, and produces command data in such a manner that the motor driving circuit 816 produces the signal 816e for opening the gate 820 in predetermined timing.

The circuits designated by numerals 831 and 832 are for writing the magnetic data in the magnetic stripe of the passbook and for reading the magnetic data, respectively. These circuits, in response to the predetermined data on the control bus 807b, collects the data from the data bus 807a, and in accordance with this data, applies a signal to the magnetic head 166 or applies the input signal from the magnetic head to the multiplexer 815 via the internal data bus 835. The write data to the magnetic stripe or the read data from the magnetic tape is transmitted to or received from the data storage 802 by using the functions of the DMA control unit 804. The DMA request signal (REQ2) is produced when the flip-flop 834 is set via the OR gate 833.

It will be understood from the foregoing description that the transaction equipment according to the present invention comprises the basic module having the basic functions of executing the transactions and controlled by a programmable microprocessor, and at least one sub-module having the functions of executing additional transactions and controlled by a programmable microprocessor, the sub-module being operated in response to the task data applied from the basic module microprocessor.

The operation of the mechanical or electrical terminal units included in the sub-module of the transaction equipment according to the invention is thus controlled without imposing any burden on the basic module microprocessor, so that the operation of the sub-module terminal may be overlapped on that of the basic module terminal, thus shortening the time required before completion of each transaction. Further, the sophisticated terminal operations requiring frequent data processing including bill verification in the depositing transactions and the printing in passbook transactions are controlled by exclusive microprocessor, thereby increasing the reliability of the transaction equipment to a very high level.

Although the sub-module operation is controlled by the switches on the control panel included in the basic module control system in the above-described embodiment, the switches for turning on and off the sub-module may alternatively be located on the remote control panel for monitoring the operating condition of the transaction equipment or the interface unit of each sub-module.

Also, in the above-described embodiment, the two sub-modules including the printer module and the depository module, together with the basic module, make up one transaction equipment. Without departing from the spirit of the present invention, however, each module may be provided with two or more transaction functions or two or more sub-modules may be provided to make a multiplicity of types of transactions available.

Furthermore, according to the above-mentioned embodiment, the equipment is controlled in such a sequence that after the user designates a type of transaction, the transaction sequence program associated with the particular type of transaction is started and the guidance to user instructing him to insert the ID card or passbook appears. The control sequence, however, may be changed in such a manner that the insertion of a transaction medium such as ID card or passbook may be preceded to the selection of the type of transaction. These modifications are easily achieved by changing the program stored in the program storage of the basic module.

We claim:

1. A transaction equipment comprising a basic module for executing basic transactions, at least one submodule for executing sub-transactions, and means for interconnecting said basic module and said sub-module, said basic module comprising: a first data bus for transmitting address data and control data; a user operation unit operated by a user in accordance with a transaction procedure in order to enter the information for setting the transaction conditions; first terminal control means connected to said data bus for controlling said user operation unit, said first terminal control means being operated in response to predetermined address data on the data bus, said first terminal control means producing selectively control signals for operating said user operation unit in accordance with the control data on the data bus, said means further selectively applying the status signals of the user operation unit to said data bus; a first article processing unit for processing transaction articles related to the basic transactions; second terminal control means connected to said data bus for controlling said first article processing unit, said second terminal control means being operated in response to a predetermined address on the data bus, said second terminal control means producing selectively control signals for operating said article processing unit in accordance with the control data on the data bus, said means further selectively applying the status signals for said article processing unit to said data bus; a first interface unit connected to said data bus for data communication with said sub-module; and a programmable microprocessor unit connected to said data bus, said programmable microprocessor unit including a program storage for storing a plurality of transaction sequence programs corresponding to types of transactions, and data storage for storing the data temporarily, said microprocessor receiving data on the data bus in accordance with the program and applying to said data bus the address data and control data for proceeding with the transaction operations;

said sub-module comprising: a second data bus for transmitting address data and control data; a second article processing unit for processing articles related to the sub-trasactions; third terminal control means connected to said second data bus for controlling said second article processing unit, said means being operated in accordance with predetermined address data on said second data bus, said means selectively producing control signals for operating said second article processing unit in accordance with the control data on said second data bus, said means further applying selectively the status signals for said second article processing unit to said second data bus; a second interface unit connected with said second data bus for data communication with said basic module; and a second programmable microprocessor unit connected to said second data bus, said unit including a program storage for storing sub-programs and a data storage for temporarily storing data, said unit receiving the data on said second data bus in accordance with said sub-program in response to the data received from said second interface unit, said unit applying address data and control data for proceeding with the transaction operations onto said second data bus;

said basic module selectively supplying to said sub-module through said first and second interface units, data for predetermined operation of said sub-module.

2. A transaction equipment according to claim 1, in which said first article processing unit includes at least a first storage for storing a plurality of articles to be discharged, a first slot for discharging the articles out of the transaction equipment, means for collecting the articles from said storage and transporting them to said discharge slot, a control circuit for controlling the operation of the components included in said first article processing unit, and a plurality of status sensor means for generating status signals to be applied to said second terminal control means; said second article processing means including a second slot through which the user inserts articles to be deposited, a second storage for storing a plurality of articles received, means for transporting the articles inserted into said second slot, to said second storage, a control circuit for controlling the operation of the components included in said second article processing unit in response to the control signal from said third terminal control means, and a plurality of status senser means for generating status signals to be supplied to said third terminal control means.

3. A transaction equipment according to claim 1, in which said first article processing unit includes a unit for processing the user ID card recorded with the user information, and a unit for processing the articles to be delivered to the user; said ID card processing unit including a card insertion slot for receiving the ID card from the user, means for transporting the ID card inserted into said card insertion slot, sensor means for performing selected one of the operations of reading the user information from and writing the user information in the ID card in transport, a control circuit for operating said ID card transport means in response to the control signal from said second terminal control means; and means for signal transfer between said sensor means and said second terminal control means; said article processing unit including at least a first storage for storing a plurality of articles to be discharged, a first slot for discharging the articles out of the transaction equipment, means for collecting the articles out of said storage and transporting them to said first discharge slot, a control circuit for controlling the operation of the components included in said article processing unit in response to the control signal from said second terminal control means, and a plurality of status sensor means for generating status signals to be supplied to said second terminal control means.

4. A transaction equipment according to claim 1 or 3, comprising first and second sub-modules, in which said article processing unit of said first sub-module includes a second slot through which the user inserts articles to be deposited, a second storage for storing the articles received, means for transporting the articles inserted into said second slot, to said second storage, a control circuit for controlling the operation of the components included in said article processing unit in response to the control signal from said terminal control means, and a plurality of status senser means for generating status signals to be supplied to said terminal control means; the article processing unit of said second sub-module including a third slot through which the user inserts articles to be printed with data, means for printing data, means for transporting the articles inserted into said third slot, to the position of said printing means, a control circuit for controlling the operation of the components included in said article processing unit in response to the control signal from the terminal control means, and a plurality of status sensor means for generating status signals to be supplied to said terminal control means.

5. A transaction equipment according to claim 1, in which said basic module further includes transaction type selector means connected to said first data bus and operable by the owner of the transaction equipment, said programmable microprocessor controlling said user operation unit in such a manner as to limit the types of transaction to be selected by the user, in accordance with the status of said transaction type selector means.

6. A transaction equipment according to claim 1, in which said basic module further includes a data storage access unit connected to said data bus, said data storage access unit being also connected to said microprocessor and said first interface unit, said data storage access unit being so operated as to control the data transfer between said interface unit and a predetermined address in said data storage through said first data bus in response to the control signal from said first interface unit, thus setting in said first interface unit, the data to be supplied to the sub-module from said basic module.

7. A transaction equipment according to claim 1, in which said first and second interface units include selected one of a circuit for converting parallel data into serial data and a circuit for converting serial data into parallel data, serial data being transferred between said basic module and said sub-module.

* * * * *